(12) United States Patent
Kobayashi

(10) Patent No.: US 7,525,536 B2
(45) Date of Patent: Apr. 28, 2009

(54) COORDINATE INPUT DEVICE, CONTROL METHOD THEREFOR, AND CONTROL PROGRAM FOR IMPLEMENTING THE METHOD

(75) Inventor: Kiwamu Kobayashi, Yokohama (JP)

(73) Assignee: Canon Kabushiki Kaisha (JP)

( * ) Notice: Subject to any disclaimer, the term of this patent is extended or adjusted under 35 U.S.C. 154(b) by 748 days.

(21) Appl. No.: 11/145,118

(22) Filed: Jun. 3, 2005

(65) Prior Publication Data

US 2006/0007185 A1 Jan. 12, 2006

(30) Foreign Application Priority Data

Jun. 3, 2004 (JP) ............... 2004-166340

(51) Int. Cl.
*G06F 3/041* (2006.01)
(52) U.S. Cl. .................. 345/173; 345/175; 345/176; 178/18.01; 178/18.09
(58) Field of Classification Search ......... 345/173–183; 178/18.01–18.09, 19.01–19.06
See application file for complete search history.

(56) References Cited

U.S. PATENT DOCUMENTS

| | | | |
|---|---|---|---|
| 4,507,557 A | | 3/1985 | Tsikos |
| 5,420,637 A | * | 5/1995 | Zeevi et al. ............ 375/240.12 |
| 6,208,330 B1 | * | 3/2001 | Hasegawa et al. ........... 345/173 |
| 6,433,543 B1 | * | 8/2002 | Shahinpoor et al. ....... 324/244.1 |

FOREIGN PATENT DOCUMENTS

| | | |
|---|---|---|
| JP | 5-173699 A | 7/1993 |
| JP | 2000-105671 A | 4/2000 |
| JP | 2001-84106 A | 3/2001 |
| JP | 2001-142642 A | 5/2001 |
| JP | 2002-32189 A | 1/2002 |
| JP | 2002-91701 A | 3/2002 |
| JP | 2002-268812 A | 9/2002 |
| JP | 2002-297318 A | 10/2002 |
| JP | 2002-351615 A | 12/2002 |

* cited by examiner

*Primary Examiner*—Vijay Shankar
(74) *Attorney, Agent, or Firm*—Rossi, Kimms & McDowell LLP

(57) ABSTRACT

A coordinate input device which is capable of performing accurate and appropriate detection of a pen-up/pen-down state over the entire coordinate input surface, based on motion of an indication tool or the like in a direction substantially perpendicular to the coordinate input surface, and realizing a function equivalent to that of an indication tool equipped with a communication function without using the tool. A light-shaded position shaded from light on the coordinate input surface by input of the indication tool on the coordinate input surface is detected, and then the coordinates of the light-shaded position are calculated. Further, the pen-up/pen-down state of the indication tool is determined based on a temporal change in light shading in the light-shaded position.

14 Claims, 29 Drawing Sheets

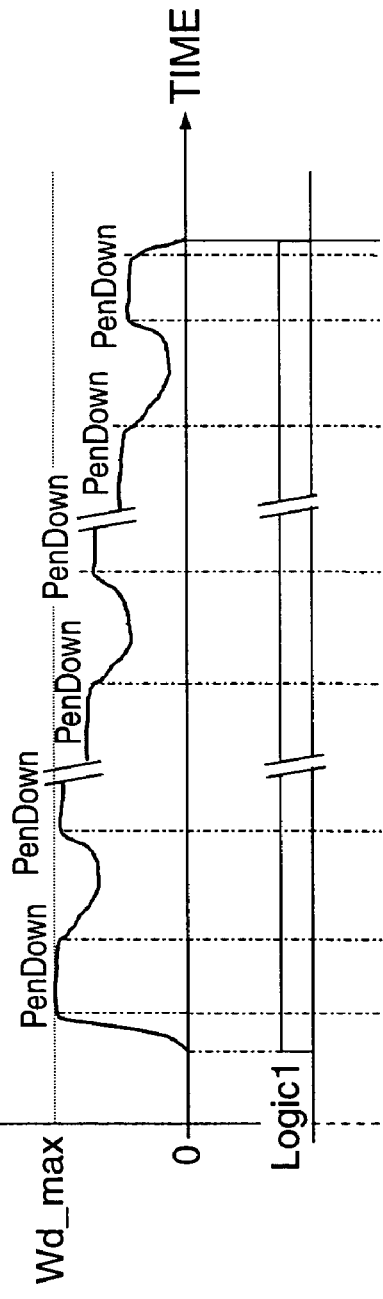
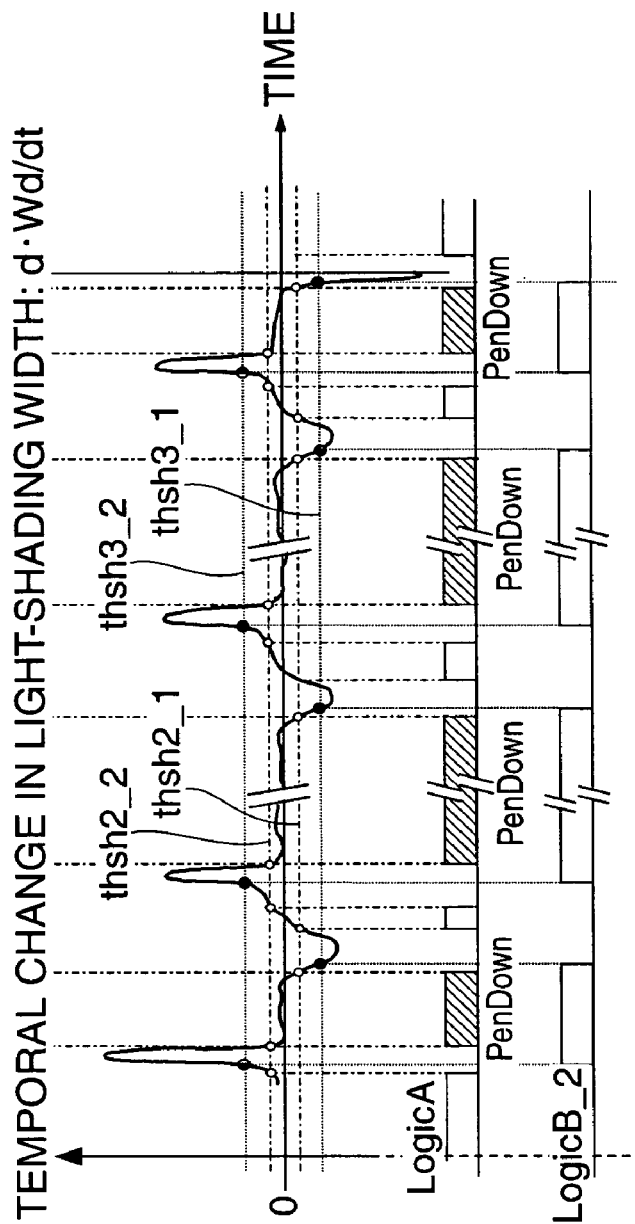
FIG. 16A
FIG. 16B

COORDINATE INPUT DEVICE, CONTROL METHOD THEREFOR, AND CONTROL PROGRAM FOR IMPLEMENTING THE METHOD

BACKGROUND OF THE INVENTION

1. Field of the Invention

The present invention relates to a coordinate input device capable of detecting a position indicated by a pen or the like on an input surface and determining the coordinates of the position, and a control method therefor as well as a control program for implementing the method.

2. Description of the Related Art

In general, a coordinate input device is used to control a computer connected to the coordinate input device or write letters or figures by indicating a position on a coordinate input surface by a light-shading member, such as an indication tool or a finger, to thereby input the coordinates of the position.

Conventional coordinate input methods employed by the coordinate input devices of the above-mentioned type include ones using a resistance film, ones using ultrasound, ones using light, and other various methods. A method using light has been disclosed e.g. in U.S. Pat. No. 4,507,557.

In the coordinate input device proposed in U.S. Pat. No. 4,507,557, a retroreflective sheet is provided outside a coordinate input surface such that light projected from a light-projecting section can be reflected by the retroreflective sheet, and a light-receiving section receives the retroreflected light to detect a light amount distribution. The coordinate input device detects the angle of a spot shaded from light by an indication tool or a finger on the coordinate input surface, and determines the coordinates of a light-shaded position, i.e. an input position. Further, coordinate input devices have been disclosed in Japanese Laid-Open Patent Publications (Kokai) No. 2000-105671 and No. 2001-142642, in which a retroreflective member is provided around a coordinate input surface, such as a touch panel, and the coordinates of a portion shaded from retroreflected light from the retroreflective member are detected.

Generally, it is known that a coordinate input device is desirably provided with not only a pen-up/pen-down determining function, but also a proximity input function (proximity function), in view of accuracy in coordinate input operation. The pen-up/pen-down determining function enables discrimination between two basic states of an indication tool with respect to a coordinate input surface, i.e. a pen-up state (state before the indication tool or pen enters an input track) and a pen-down state (state after the indication tool or pen has entered an input track). The proximity input function enables detection of a coordinate position beforehand when the indication tool is in the pen-up state. Further, the proximity input function makes it possible to display the detected coordinates by a cursor in the pen-up state, and enables a user to carry out a coordinate input operation while confirming the detected coordinates displayed in advance by the cursor.

However, the coordinate input devices proposed, in U.S. Pat. No. 4,507,557 and Japanese Laid-Open Patent Publications (Kokai) No. 2000-105671 and No. 2001-142642 are not equipped with either the pen-up/pen-down determining function or the proximity input function, and therefore they have a problem in terms of accuracy in coordinate input operation. More specifically, in a coordinate input device operated using a touch panel, normally, a coordinate input operation is carried out on a coordinate input surface using an indication tool which is not provided with a state notifying means for notifying the pen-up/pen-down state, or using a finger. The coordinate input devices wherein the indication tool is not provided with the state notifying means are often configured such that when the position of the indication tool is detected, it is determined that the indication tool is in the pen-down state. Of course, such coordinate input devices are not provided with the proximity input function.

On the other hand, coordinate input devices provided with the pen-up/pen-down determining function in view of accuracy in coordinate input operation have been disclosed e.g. in Japanese Laid-Open Patent Publications (Kokai) No. 2002-091701 and No. 2001-084106. In the coordinate input device proposed in Japanese Laid-Open Patent Publication (Kokai) No. 2002-091701, a light-shading-type touch panel is used, and the pen-up/pen-down state is determined based on the degree of light shading in coordinate input operation. In the coordinate input device proposed in Japanese Laid-Open Patent Publication (Kokai) No. 2001-084106, the pen-up/pen-down state of an indication tool is determined based on a change in distance between the indication tool and the coordinate input surface as well as a change in the level of depth of a dip in light intensity distribution (a valley between a falling edge and a following rising edge of a light intensity distribution waveform).

However, the coordinate input devices disclosed in Japanese Laid-Open Patent Publications (Kokai) No. 2002-091701 and No. 2001-084106 suffer from the following problems.

First, a description will be given of problems with the coordinate input device proposed in Japanese Laid-Open Patent Publication (Kokai) No. 2002-091701. In the light-shading-type touch panel of the above-mentioned type, an area (retroreflective zone) where reflected light for detecting light shading passes forms a relatively thin layer in parallel with the coordinate input surface. However, the distance between this thin layer and the coordinate input surface is not necessarily accurately constant over the entire area. Therefore, it is difficult to determine the pen-up/pen-down state accurately by the above described method. Further, since the retroreflective zone is thin, a range enabling detection of light shading is narrow, which makes it difficult to fully exert the proximity input function.

Next, a description will be given of problems with the coordinate input device proposed in Japanese Laid-Open Patent Publication (Kokai) No. 2001-084106, with reference to FIGS. 28, 29, and 7A to 7C.

In this coordinate input device, when a change in distance between the indication tool and the coordinate input surface, or more precisely, the rate of change in distance therebetween becomes smaller than a predetermined rate, it is determined that a pen-down event has occurred.

Some pens used for coordinate input devices of this type do not have a constant shape. In other words, they can be deformed into some shape. Many of them are configured to be deformed upon abutment of a tip thereof against a coordinate input surface so as to improve a drawing touch or simply to imitate the touch of a conventional pen.

As shown in FIG. 28, this type of pen is in a shape indicated by a symbol A, for example, when it is not in contact with a coordinate input surface f (by a distance of h), and turns into a shape indicated by a symbol B, C, or D when it is brought into contact with the coordinate input surface f and then further pressed against the coordinate input surface f. It should be noted that A' indicates a case without deformation.

A pen which can be deformed into the shape B has a tip formed e.g. of a soft rubber-like material. A pen which can be deformed into the shape C has a tip to which is attached a part slidable like a switch. Further, a pen which can be deformed into the shape D has a brush-like tip deformable into a tail-like portion.

In general, in the coordinate input device of a light-shading type proposed in Japanese Laid-Open Patent Publication (Kokai) No. 2001-084106, a retroreflective zone is so thin that a range within which light shading can be detected is not more than several millimeters in thickness in the direction perpendicular to the coordinate input surface. For this reason, an adequate proximity input function cannot be provided. As a solution to this problem, the use of a pen which can be deformed into the shape indicated by the symbol B, C, or D can be envisaged so as to realize a virtually adequate proximity input function (see h0 and |h0| in FIG. 28).

However, even when the pen which can be deformed as described above is used, the coordinate input device proposed in Japanese Laid-Open Patent Publication (Kokai) No. 2001-084106 determines the occurrence of a pen-down event based on a change in the distance between the indication tool and the coordinate input surface. For this reason, when the distance between the indication tool and the coordinate input surface becomes equal to 0 (i.e. a stage indicated by the symbol A'), it is determined that the indication tool is in the pen-down state, and therefore the occurrence of a pen-down event cannot be judged from abutment of the indication tool against the coordinate input surface, including predetermined mechanical deformation (|h0|) as shown by the case B, C, or D. In short, even when the deformable pen is used, the virtually adequate proximity input function cannot be realized.

Further, in Japanese Laid-Open Patent Publication (Kokai) No. 2001-084106, the pen-up/pen-down state of the indication tool is determined based on a change in the level of depth of a dip in light intensity distribution.

In the following, this point will be studied.

Assuming that a pen 105 having a predetermined shape is approaching a coordinate input surface, insofar as the tip of the pen 105 is within a retroreflective zone 100 as shown in a state indicated by P1 in FIG. 29, the depth (Dpth) and width (Wd) of the valley of the light shading-dependent waveform increases as the pen tip becomes closer to the coordinate input surface 104 (see FIG. 7A).

Further, when the tip end of the pen 105 reaches the lower edge of the retroreflective zone 100 (i.e. a position indicated by P2 in FIG. 29), the depth Dpth of the valley reaches a maximum Dpth value Dpth_max (see FIG. 7B), and from then on (i.e. in positions indicated by P2 and P3 (P4) in FIG. 29), the Dpth value never changes but only the width (Wd) of the valley of the light shading-dependent waveform increases (see FIG. 7C).

This is because when the tip of the pen 105 reaches a position not higher than the lower edge of the retroreflective range 100 (i.e. below the position indicated by P2 in FIG. 29), light is substantially 100% blocked by the approximately central portion of the pen 105, and therefore there is no more light shading by the central portion of the pen 105.

As described above, insofar as the change in the level of depth of the dip in the light intensity distribution is concerned, when the pen 105 reaches the position indicated by P2 in FIG. 29, the depth of the dip reaches its maximum value, and even when the pen 105 further moves to the positions indicated by P2 and P3 (P4) in FIG. 29, the depth of the dip is held constant.

However, in the case where determination of the pen-up/pen-down state of the indication tool is performed based a change in the level of depth of a dip in light intensity distribution as in Japanese Laid-Open Patent Publication (Kokai) No. 2001-084106, the range from the position P2 to the position P3 (P4) is a dead zone for the function of detecting a pen. For this reason, the pen-down state is determined only in a stage where the pen 105 is in the vicinity of the position 2 or before the stage, but cannot be determined e.g. when the pen 105 is in the vicinity of the position P3 or P4.

In general, it is desirable, in view of operability of the pen 105, that determination of the pen-down state should be performed when the pen is at a position closest possible to the position for abutment against the coordinate input surface. However, the coordinate input device proposed in Japanese Laid-Open Patent Publication (Kokai) No. 2001-084106 is not capable of determining the pen-down state in the vicinity of the position P3 or P4 of the pen 105, which is a negative aspect of the coordinate input device in terms of the operability of the pen 105.

To solve the above-described problems with the coordinate input devices disclosed in Japanese Laid-Open Patent Publications (Kokai) No. 2002-091701 and No. 2001-084106, a method has been proposed which uses a special pen equipped with a function of transmitting a pen-down signal to the light-shading-type touch panel. More specifically, in this method, a switch is provided e.g. on the tip of the pen, and when the pen abuts against the coordinate input surface, the switch is depressed, whereby the pen-down signal is transmitted in real time by infrared rays, ultrasound, electromagnetic waves, or the like. This method makes it possible to perform an appropriate determination of the pen-up/pen-down state.

However, the light-shading-type touch panel provided with the indication tool having the above-mentioned communication function has the following disadvantages: First, it is necessary to transmit the pen-down signal, and hence the pen per se is complicated (expensive, larger in size). Secondly, since it is necessary to transmit the pen-down signal, a power supply (battery or the like) is needed for the signal transmission. Thirdly, since it is necessary to transmit the pen-down signal, the thickness of the retroreflective zone 100 is limited to prevent an excessive increase in depth of a frame portion surrounding the coordinate input surface, and therefore the range within which light shading can be detected is narrowed, which makes it difficult to fully exert the proximity input function.

SUMMARY OF THE INVENTION

It is an object of the present invention to provide a coordinate input device which is capable of performing accurate and appropriate detection of a pen-up/pen-down state over the entire coordinate input surface, based on motion of an indication tool or the like in a direction substantially perpendicular to the coordinate input surface, and realizing a function equivalent to that of an indication tool equipped with a communication function without using the tool, and a control method therefor as well as a control program for implementing the method.

To attain the above object, in a first aspect of the present invention, there is provided a coordinate input device that detects a position on an input surface indicated by indication means and determines coordinates of the position, comprising a detector section that detects light, a coordinate calculating section that calculates coordinates of the position indicated by the indication means, based on a light intensity distribution detected by the detector section, and a determining section that determines an input state of the indication means with respect to the input surface, based on a temporal change in the light intensity distribution.

Preferably, the coordinate input device comprises a light-projecting section that emits light in planar directions along the input surface, and a reflective section that reflects emitted light from the light-projecting section, and the detector section is configured to receive the reflected light from the reflective section, pixel by pixel, and detect the light intensity distribution of the reflected light, the determining section determining whether the input state of the indication means is a pen-up state or a pen-down state, based on a temporal change in a first light-shading amount obtained by adding together differences between a light intensity distribution formed when a light-shaded portion shaded from light by the indication means exists on the input surface and a light intensity distribution formed when no light-shaded portion exists on the input surface, in a direction along a sequence of pixels, or based on a temporal change in a first width as a pixel range within which the differences exceed a predetermined level.

Preferably, the coordinate input device comprises a light-projecting section that emits light in planar directions along the input surface, and a reflective section that reflects emitted light from the light-projecting section, and the detector section is configured to receive the reflected light from the reflective section, pixel by pixel, and detect the light intensity distribution of the reflected light, the determining section determining whether the input state of the indication means is a pen-up state or a pen-down state, based on a temporal change in a second light-shading amount obtained by adding together changes caused by light shading, in a distribution waveform obtained by normalizing a light intensity distribution formed when a light-shaded portion shaded from light by the indication means exists on the input surface, by a light intensity distribution formed when no light-shaded portion exists on the input surface, in a direction along a sequence of pixels, or based on a temporal change in a second width as a pixel range within which the changes caused by light shading exceed a predetermined level.

More preferably, only when a magnitude of the temporal change in the first light-shading amount is not larger than a predetermined threshold value, and at the same time the temporal change is within a time period defined between a time point the temporal change assumes a maximal value and a time point the temporal change assumes a first minimal value thereafter, the determining section determines the input state of the indication means as the pen-down state, whereas when the input state of the indication means is not determined as the pen-down state, the determining section determines the input state of the indication means as the pen-up state.

More preferably, only when the first light-shading amount is larger than a predetermined threshold value, the determining section determines whether the input state of the indication means is the pen-up state or the pen-down state.

More preferably, only when a magnitude of the temporal change in the second light-shading amount is not larger than a predetermined threshold value, and at the same time the temporal change is within a time period defined between a time point the temporal change assumes a maximal value and a time point the temporal change assumes a first minimal value thereafter, the determining section determines the input state of the indication means as the pen-down state, whereas when the input state of the indication means is not determined as the pen-down state, the determining section determines the input state of the indication means as the pen-up state.

More preferably, only when the second light-shading amount is larger than a predetermined threshold value, the determining section determines whether the input state of the indication means is the pen-up state or the pen-down state.

More preferably, only when a magnitude of the temporal change in the first width is not larger than a predetermined threshold value and at the same time the temporal change is within a time period defined between a time point the temporal change assumes a maximal value and a time point the temporal change assumes a first minimal value thereafter, the determining section determines the input state of the indication means as the pen-down state, whereas when the input state of the indication means is not determined as the pen-down state, the determining section determines the input state of the indication means as the pen-up state.

More preferably, only when a magnitude of the temporal change in the second width is not larger than a predetermined threshold value, and at the same time the temporal change is within a time period defined between a time point the temporal change assumes a maximal value and a time point the temporal change assumes a first minimal value thereafter, the determining section determines the input state of the indication means as the pen-down state, whereas when the input state of the indication means is not determined as the pen-down state, the determining section determines the input state of the indication means as the pen-up state.

Preferably, when the input state of the indication means continues to be determined as the pen-up state over a predetermined time period, the determining section determines the input state of the indication means as the pen-up state when the predetermined time period has elapsed.

Preferably, the coordinate input device further comprises a display device disposed on the input surface.

To attain the above object, in a second aspect of the present invention, there is provided a method of controlling a coordinate input device that detects a position on an input surface indicated by indication means and determines coordinates of the position, comprising a detection step of detecting light, a coordinate calculating step of calculating coordinates of the position indicated by the indication means, based on a light intensity distribution detected in the detection step, and a determining step of determining an input state of the indication means with respect to the input surface, based on a temporal change in the light intensity distribution.

To attain the above object, in a third aspect of the present invention, there is provided a program for causing a computer to execute a control method for a coordinate input device that detects a position on an input surface indicated by indication means and determines coordinates of the position, comprising a detection module for detecting light, a coordinate calculating module for calculating coordinates of the position of indicated by the indication means, based on a light intensity distribution detected by the detection module, and a determination module for determining an input state of the indication means on the input surface, based on a temporal change in the light intensity distribution.

The above and other objects, features, and advantages of the invention will become more apparent from the following detailed description taken in conjunction with the accompanying drawings.

BRIEF DESCRIPTION OF THE DRAWINGS

FIGS. 16A and 16B are graphs showing the relationship between the light-shading width and time, which are useful in explaining the second algorithm of the control program for the coordinate input device according to the present embodiment;

DETAILED DESCRIPTION OF THE PREFERRED EMBODIMENTS

The present invention will now be described in detail with reference to the accompanying drawings showing a preferred embodiment thereof.

First, a description will be given of the outline of an embodiment of the present invention.

Figure 1:
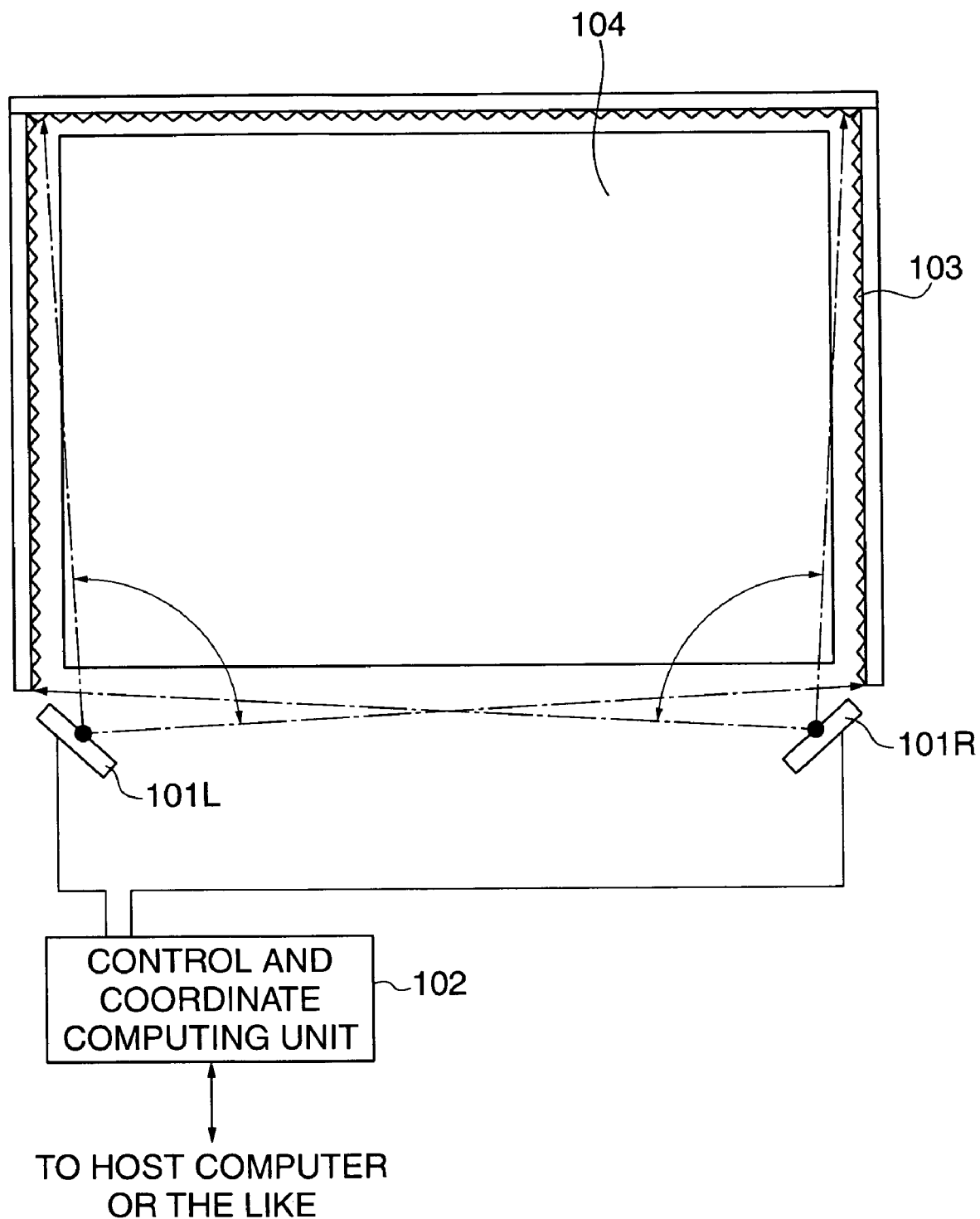
FIG. 1 is a plan view showing the overall hardware configuration of a coordinate input device according to an embodiment of the present invention.
Figure 2:
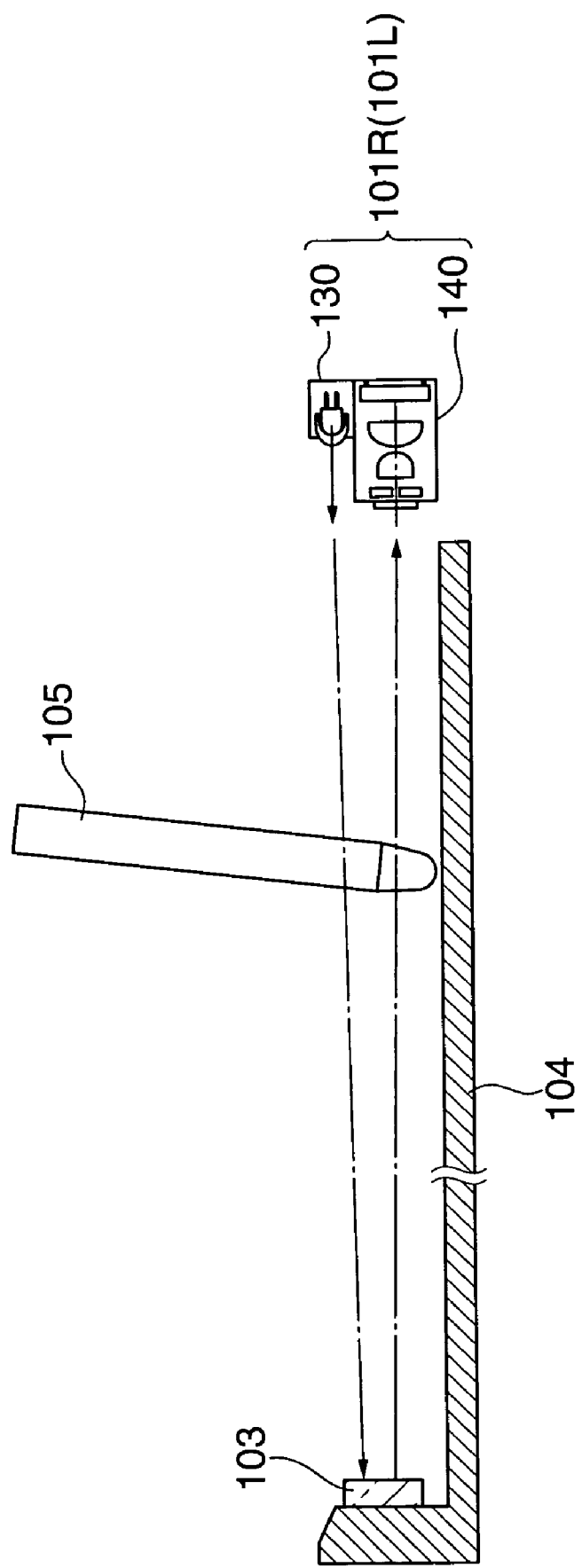
FIG. 2 is a view schematically showing the construction of the coordinate input device in FIG. 1, as viewed from a lateral side thereof.

FIG. 1 is a plan view showing the overall hardware configuration of a coordinate input device according to the present embodiment, and FIG. 2 is a view schematically showing the construction of the coordinate input device in FIG. 1, as viewed from a lateral side thereof.

The coordinate input device is provided with a coordinate input surface (input area) 104 having a rectangular shape, for example, and a retroreflective member 103 is disposed in a manner surrounding three sides of the coordinate input surface 104 in a frame shape. The coordinate input surface 104 is implemented by a display screen of a display device, such as a PDP, a rear projector, or a LCD panel, such that it can be used as an interactive input device.

A pair of coordinate-detecting sensor units (hereinafter referred to as "the coordinate sensor units") 101L and 101R are arranged on the respective left and right ends of the open side of the coordinate input surface 104, where the retroreflective member 103 is not provided, in a manner spaced from each other by a predetermined distance. Each of the coordinate sensor units 101L and 101R is a sensor unit comprised of a light-projecting section 130 and a light-receiving section 140, for detecting coordinates, which will be described in detail hereinafter with reference to FIG. 18, and is connected to a control and coordinate computing unit 102 for controlling the coordinate input device and performing coordinate computation. The coordinate sensor units 101L and 101R receive a control signal from the control and coordinate computing unit 102 and transmit a detected signal to the control and coordinate computing unit 102.

Figure 3:
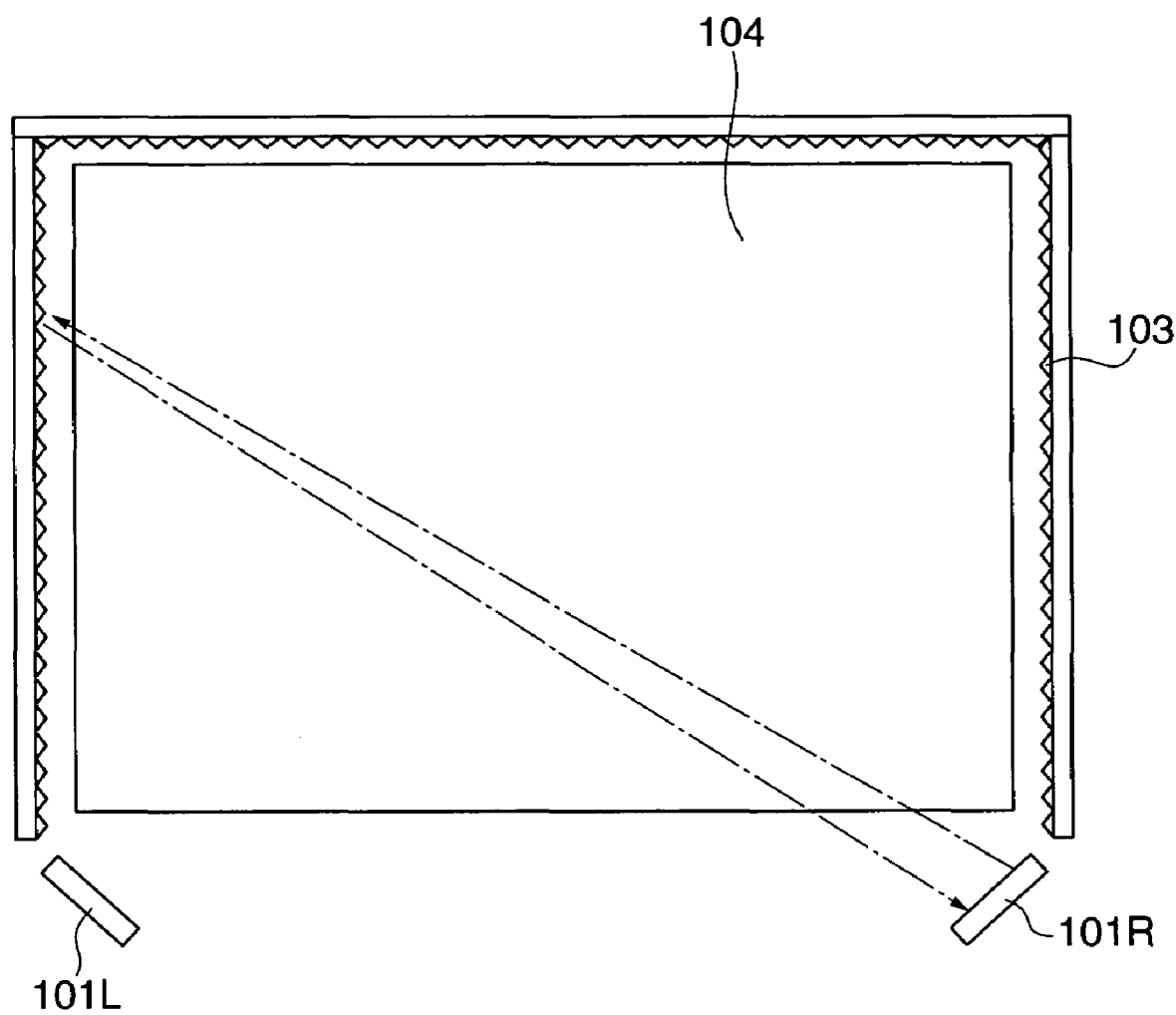
FIG. 3 is a conceptual view useful in explaining retroreflection of light projected from each of coordinate sensor units appearing in FIG. 1.

The retroreflective member 103 is a reflective member having retroreflective surfaces for reflecting incident light back toward an incoming side as shown in FIG. 3. The retroreflective member 103 retroreflects light projected from each of the left and right coordinate sensor units 101L and 101R in a fan shape over an angle range of approximately 90 degrees, toward the coordinate sensor unit 101L or 101R having projected the light. The retroreflected light is one-dimensionally detected by a line CCD provided in the light-receiving section 140 of each of the sensor units 101L and 101R, and the light intensity distribution of the retroreflected light is sent to the control and coordinate computing unit 102.

With the above construction, when an input instruction is input to the coordinate input surface by a light shading member, such as an indication tool or a finger, the light projected from the sensor unit 101L or 101R or the retroreflected light is blocked, which prevents a predetermined light intensity from being obtained. As a result, a light intensity distribution where the light intensity is low only in an input instruction position is obtained.

The control and coordinate computing unit 102 detects the light-shaded range of the input instruction position based on a change in the light intensity distribution obtained by the sensor units 101L and 101R, then locates a detection point within the light-shaded range, and calculates the incident angles of respective rays incident on the detection point. Further, the control and coordinate computing unit 102 calculates the coordinate position pointed to on the coordinate input surface 104, based on the calculated incident angles, the distance between the coordinate sensor units 101L and 101R, and so forth, and outputs the coordinate value to a host computer or the like via an interface, such as a USB.

Infrared rays projected from the light-projecting sections 130 of the coordinate sensor units 101L and 101R are reflected by the retroreflective member 103 to form an image on the line CCD within the light-receiving section 140 of each sensor unit 101L (101R). The intensity distribution (light intensity distribution in a non-light-shaded state) of light projected at this time forms a waveform shown in FIG. 4, for example.

Figure 5:
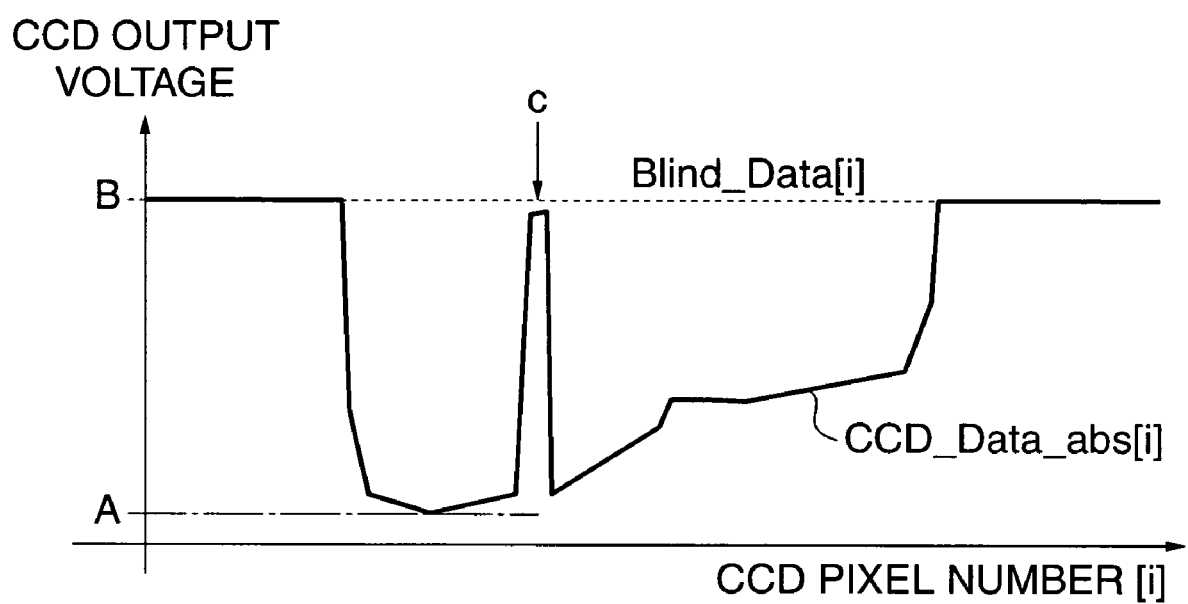
FIG. 5 is a graph showing a waveform of a light intensity distribution formed when the light projected from the coordinate sensor units in FIG. 1 is blocked.

In performing a coordinate input, an indication tool (pen) 105 is inserted approximately perpendicularly to the coordinate input surface 104 as shown in FIG. 2. At this time, a portion where light intensity is low appears in the light intensity distribution, as shown in FIG. 5, in correspondence to the position where the indication tool 105 has been inserted. This is a light-shaded position, and coordinates are calculated based on two light-shaded positions obtained respectively from the two coordinate sensor units 101L and 101R.

Figure 4:
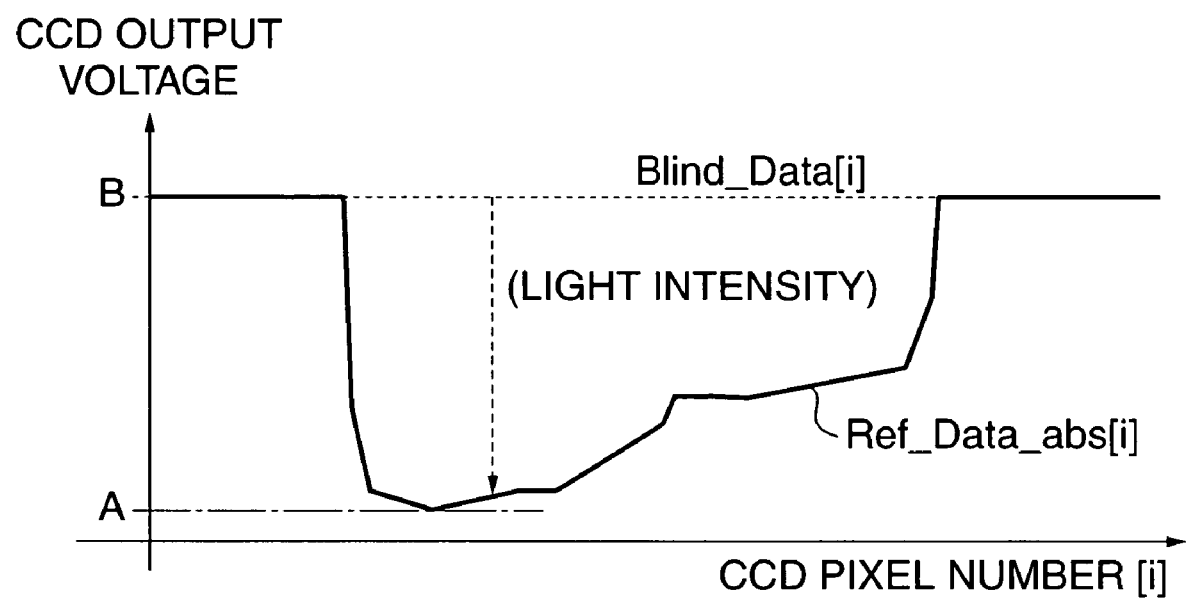
FIG. 4 is a graph showing a waveform of a background light intensity distribution formed when light projected from the coordinate sensor units in FIG. 1 is not blocked.

In actual computation of the coordinates, the light-shaded positions are each detected from a waveform (FIG. 6) obtained by normalizing the light intensity distribution waveform in FIG. 5 based on the intensity distribution waveform in FIG. 4 used as a reference waveform.

Figure 6:
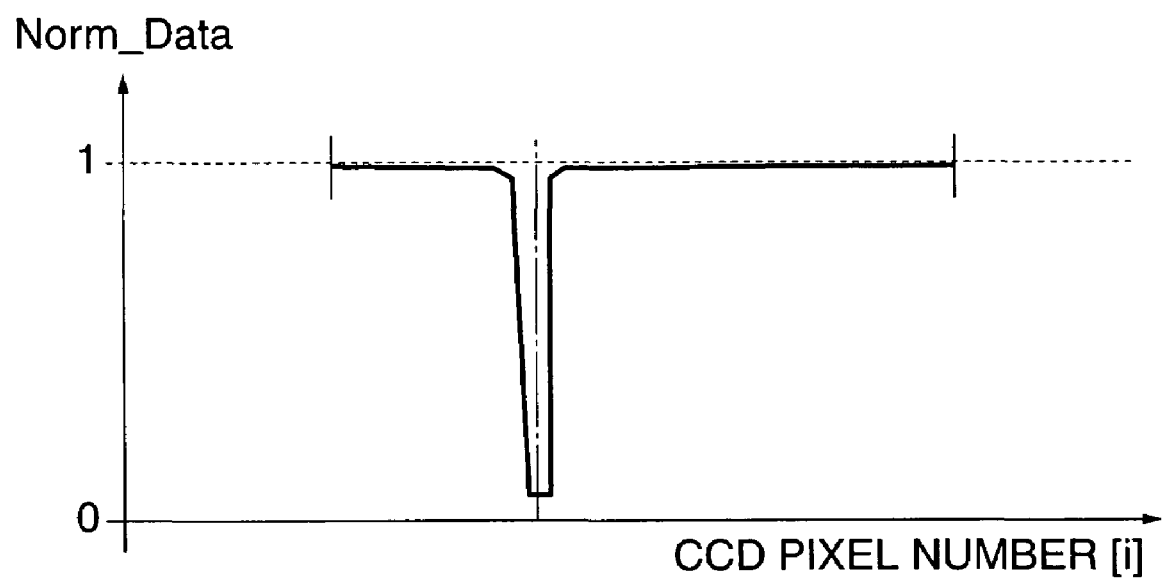
FIG. 6 is a graph showing a waveform of a relative intensity distribution normalized based on the light intensity distribution waveform formed when the light projected from the coordinate sensor units in FIG. 1 is not blocked.

In the present embodiment, a determination of the state of the indication tool 105, or more specifically, a determination of a pen-down state or a pen-up state is performed based on a change in the light shading-dependent waveform in FIG. 6.

Normally, the relationship between the light shading-dependent waveform and the position of the pen 105 in this type of light-shading-type coordinate input device can be represented as shown in FIGS. 29 and 7A to 7C.

Figure 29:
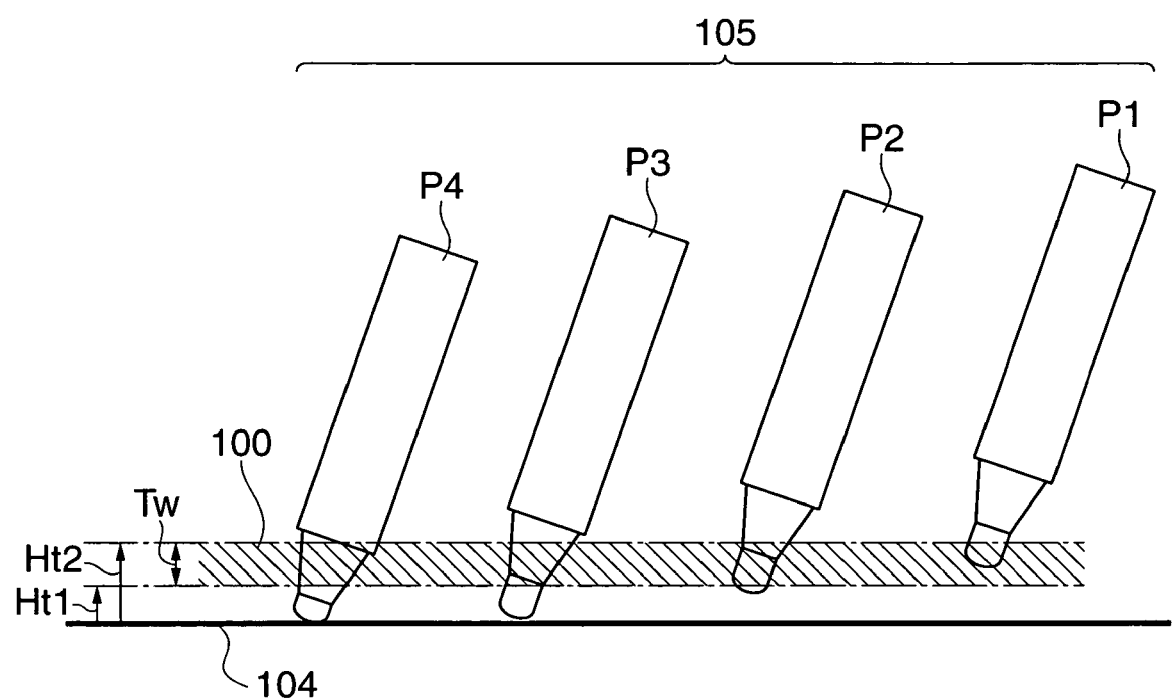
FIG. 29 is a conceptual view useful in explaining input states of the pen in FIG. 2.

Reference numeral 100 in FIG. 29 designates a retroreflective range. The retroreflective zone 100 is the retroreflective member 103 itself as viewed from the light-receiving section 140 within the coordinate sensor unit 111L (101R). The retroreflective zone 100 is determined by the width and level of the retroreflective member 103 (i.e. the width in the direction perpendicular to the coordinate input surface 104 and the level in position in the same direction) and the positional relationship between the retroreflective member 103 and the light-receiving section 140.

The depth Dpth of a valley and the width Wd of the light shading-dependent waveform in a light intensity distribution formed when a pen having a predetermined shape is approaching the coordinate input surface 104 change as described hereinbefore with reference to FIGS. 29 and 7A to 7C. More specifically, when the tip of the pen 105 reaches a position not higher than the lower edge of the retroreflective zone 100 (i.e. below a position designated by P2 in FIG. 29), light is approximately 100% blocked by the substantially central portion of the pen 105, whereafter the depth Dpth of the valley does not change any furthers and only the width Wd of the light shading-dependent waveform changes (see FIG. 7C).

The light shading-dependent waveform is determined by the size and shape of a portion of the retroreflective zone 100 which overlaps the shadow of the pen 105. Normally, the width Wd of the light shading-dependent waveform in FIG. 7C becomes larger as the position of the pen tip approaches the coordinate input surface 104, and reaches a maximum value when the pen tip reaches a predetermined position.

Figure 8:
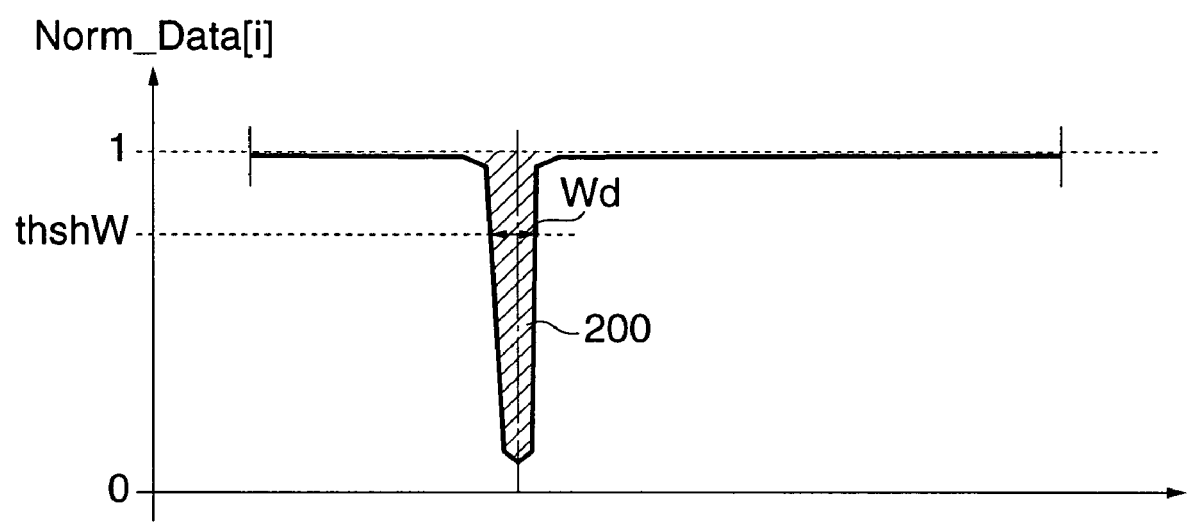
FIG. 8 is a waveform diagram showing another light intensity distribution waveform, which is useful in explaining the operation of the coordinate input device in FIG. 1.

In the present embodiment, a determination of the state of the pen 105, or more specifically, a determination of the pen-down state or the pen-up state is performed based on a hatched area in FIG. 8, i.e. a change in the area of a light-shaded portion 200 forming a valley in the light intensity distribution waveform due to light shading, or a change in the width of the light-shaded portion 200. This determination is in approximate agreement with the determination of the state of the pen 105, or more specifically, determination of the pen-down state or the pen-up state based on changes in a hatched portion in FIG. 9, i.e. the area of an overlapping portion 300 of the retroreflective zone 100 which overlaps the shape of the shadow of the pen 105.

Figure 9:
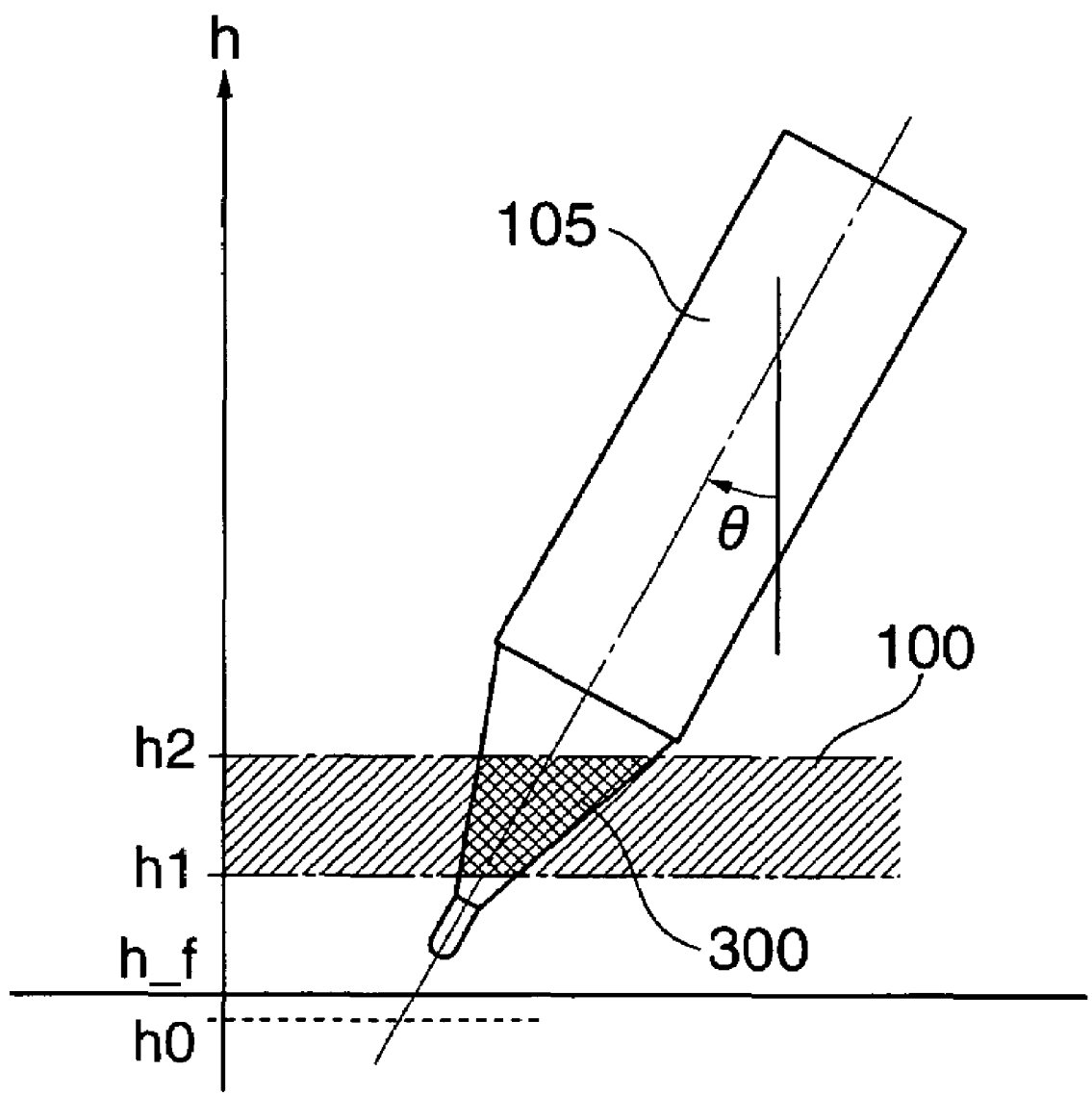
FIG. 9 is a view useful in explaining shading of the light projected from the coordinate sensor units in FIG. 1.

Now, the area of the light-shaded portion 200 on the graph in FIG. 8 is defined as a light-shading amount S_elc. Further, the actual projection area of the overlapping portion 300 in FIG. 9 is defined as a light-shaded area S_opt.

In principle, the relationship between the light-shading amount S_elc and the light-shaded area S_opt can be expressed as follows:

$$S\_elc \propto S\_opt \quad \text{(Expression 100)}$$

The above description gives an explanation of changes in the valley depth Dpth and width Wd of the waveform in the light intensity distribution formed when the pen 105 having the predetermined shape is approaching the coordinate input surface 104. The following gives an explanation of a change in the light-shading amount S_elc (or the light-shaded area S_opt) in association with a sequence of positions P1→P2→P3→P4 in FIG. 29.

In general, as the indication tool 105 moves e.g. as illustrated by the sequence of positions P1→P2→P3→P4 in FIG. 29, the value of the light-shading amount S_elc (or the light-shaded area S_opt) progressively increases, and becomes a value which is maximal and fixed when the pen 105 reaches the position P4, i.e. when the pen 105 is brought into a state pressed against the coordinate input surface 104 with a predetermined mechanical deformation. The S_elc value at this time is defined as a saturated light-shading amount S_elc_max, and similarly the S_opt value at this time as a saturated light-shaded area S_opt_max.

The present embodiment is not influenced by a location-dependent variation (more specifically a coordinate position-dependent variation) in the saturated light-shading amount S_elc_max (or the saturated light-shaded area S_opt_max) on the coordinate input surface 104. The determination of the state of the indication tool 105 (more specifically pen-up/pen-down determination) is performed by detecting a point (moment in time) at which the S_elc value (or the S_opt value) becomes maximal and constant.

According to the present embodiment, since the pen-up/pen-down determination is performed based on a temporal change in the light-shading amount or the light-shading width, it is possible to detect the motion of the pen 105 even after the pen 105 has passed through an area corresponding to P2→P3→P4 in FIG. 29, i.e. even after the tip of the pen 105 has passed the lower edge of the retroreflective zone 100, which makes it possible to perform accurate pen-down determination without a dead zone as seen in the aforementioned example disclosed in Japanese Laid-Open Patent Publication (Kokai) No. 2001-084106.

Figure 28:
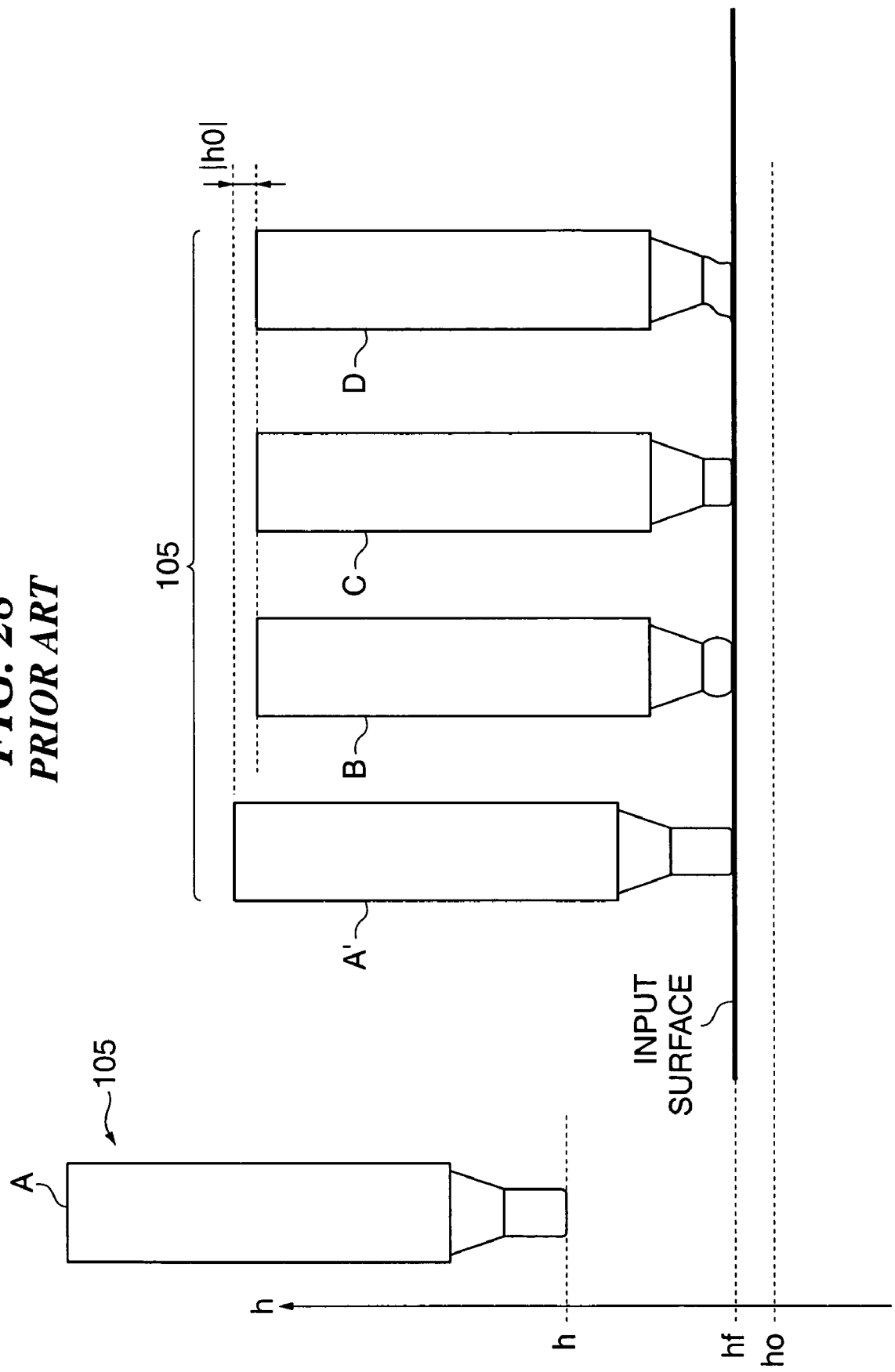
FIG. 28 is a conceptual view useful in explaining the shape of a pen in FIG. 2.

Further, even when the indication tool 105 is pressed against the coordinate input surface 104 with a predetermined mechanical deformation, as shown by positions B, C, and D in FIG. 28, so as to virtually fully realize the proximity input function, it is possible to determine that the indication tool 105 is in the pen-down state. Of course, it is possible to perform a determination of the pen-down state in or even before a stage of the position A' in FIG. 28 by appropriately setting the conditions therefor.

In the following, a description will be given of the configuration of a pen-up/pen-down determining function according to the present embodiment.

The present embodiment is configured to determine the pen-up/pen-down state based on a change in the light-shaded state, and particularly based on a temporal change in the light-shaded state in the light-shaded position.

First, the light-shaded area S_opt, the light-shading amount S_elc, and the light-shading width Wd are defined.

The hatched portion in FIG. 9, i.e. the actual projection area of the overlapping portion between the retroreflective zone 100 and the shadow of the indication tool 105 is defined as the light-shaded area S_opt. The hatched portion in FIG. 8, i.e. the area of the portion forming the valley due to light shading on the graph of the relative light intensity distribution waveform is defined as the light-shading amount S_elc. The light-shading amount S_elc is defined by the following equation described in detail hereinafter:

$$S\_elc = \Sigma_{i=1}^{N}[1-\text{Norm\_Data}(i)]$$

Figure 7A:
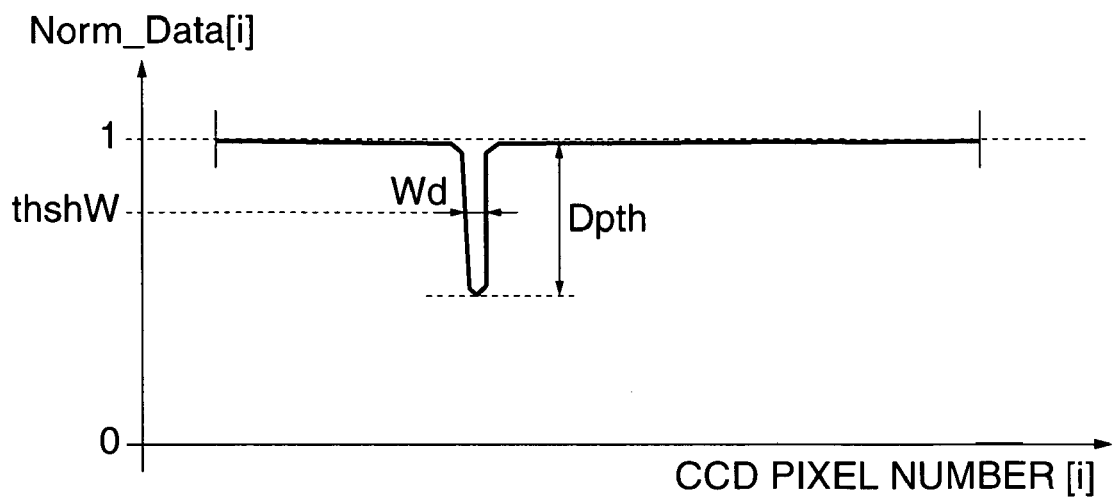
FIGS. 7A to 7C are waveform diagrams showing light intensity distribution waveforms, which are useful in explaining the operation of the coordinate input device in FIG. 1.
Figure 7B:
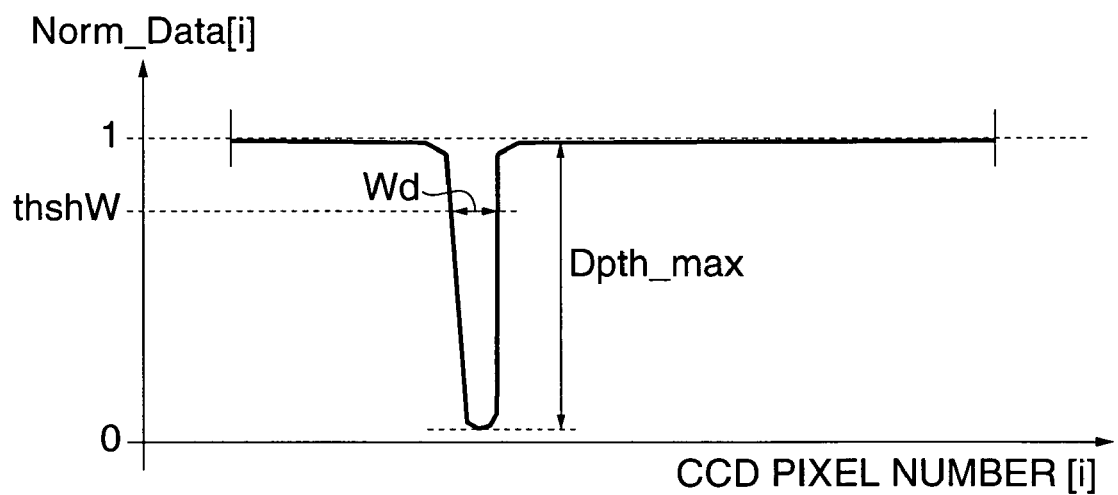
Figure 7C:
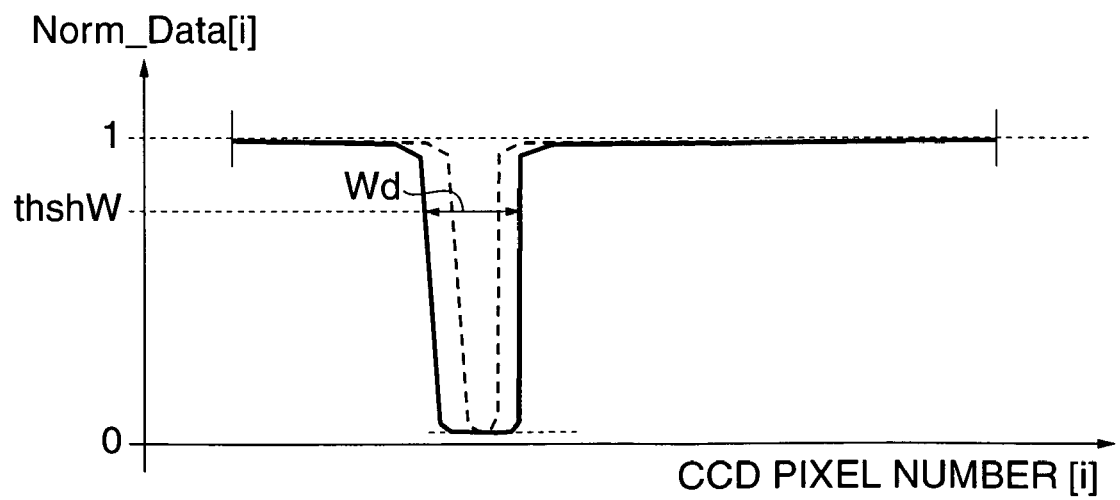

As shown in FIGS. 7A to 7C, the light-shading width Wd is defined as the width of the light-shaded portion at a position corresponding to a predetermined threshold value thshW on the graph of the relative light intensity distribution waveform.

Originally, the degree of light shading can be most objectively determined using the light-shaded area S_opt, but in the present embodiment, the light-shading amount S_elc or the light-shading width Wd is employed as a parameter indicative of the actually measurable degree of light shading, and the pen-up/pen-down state is determined based on temporal changes in these parameters.

It can be considered that the light-shading amount S_elc is substantially proportional to the light-shaded area S_opt (see Expression 100), and the light-shading width Wd also positively correlates with the light-shading amount S_elc as shown in FIGS. 7A to 7C. In order to use a change in the light-shading amount S_elc or the light-shading width Wd for unique determination, insofar as a relationship of monotonous decrease is maintained between the magnitude of the light-shading amount S_elc or the light-shading width Wd and the position of the indication tool 105 substantially perpendicular to the coordinate input surface 104, it is possible to determine the pen-up/pen-down state based on the light-shading amount S_elc or the light-shading width Wd.

In the following, the configuration of the pen-up/pen-down determining function of the present embodiment will be described in detail with reference to FIGS. 9 to 12.

Figure 10:
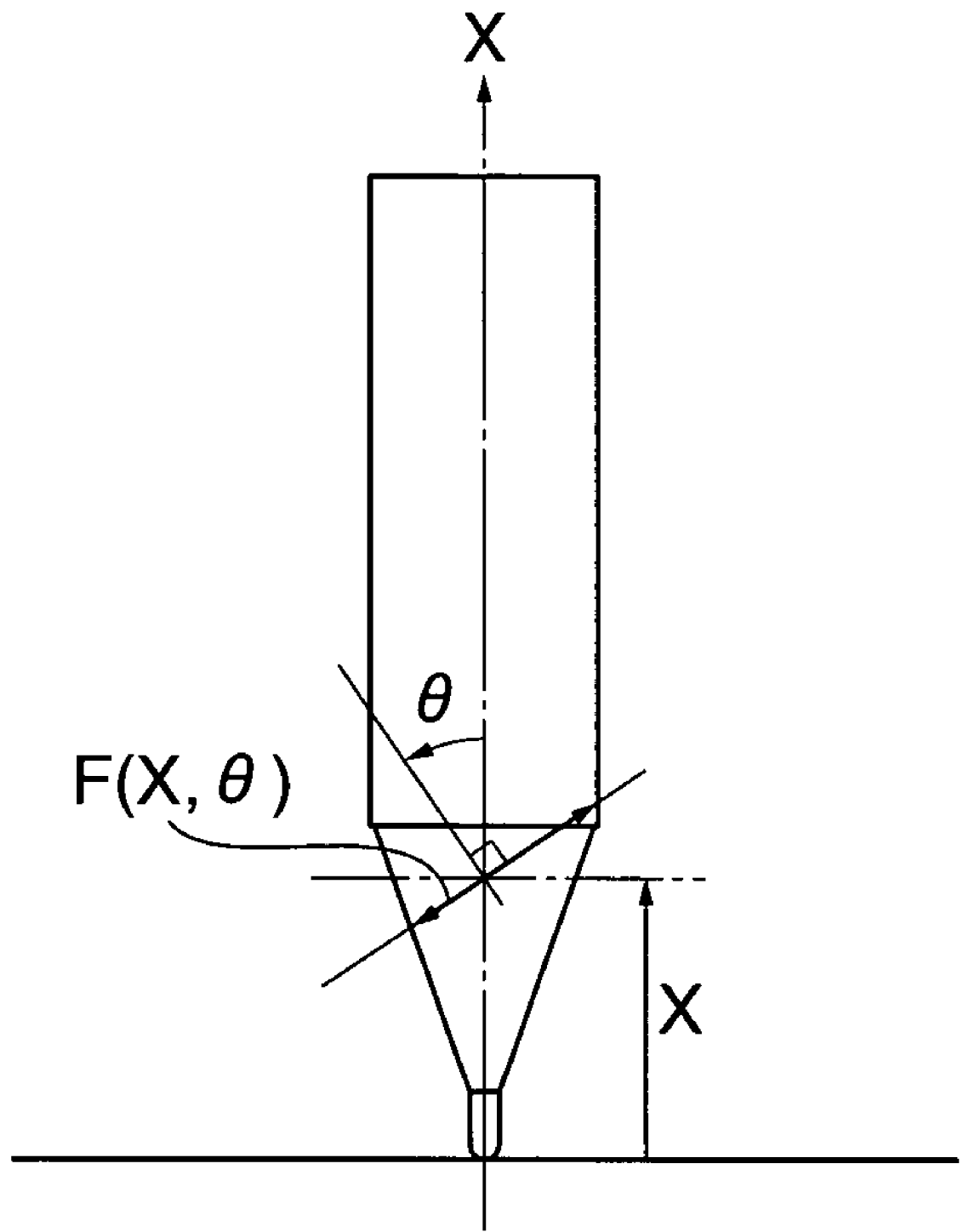
FIG. 10 is a view useful in explaining the shape of an indication tool appearing in FIG. 2.

In the present embodiment, the shape of the pen 105 is defined by a distance X from the pen tip and a width F in the direction of an angle θ at the distance X as shown in FIG. 10.

$$F = F(X, \theta) \quad \text{(Expression 101)}$$

wherein θ represents an angle formed between the main axis of the pen 105 and the normal of the coordinate input surface 104 when the pen 105 is tilted, provided that the value θ does not exceed a maximum inclination angle (e.g. ±30 degrees) prescribed by the specification of the coordinate input device.

Further, as shown in FIG. 9, in the main body of the light-shading-type coordinate input device, the retroreflective zone 100 is set to a range between a height h1 and a height h2 as measured from the coordinate input surface 104 in the direction perpendicular to the coordinate input surface 104. When the pen 105 defined by Expression 101 is inserted in the retroreflective zone 100 and its pen tip is at a position h in the direction perpendicular to the coordinate input surface 104, the light-shaded area S_opt(h) light-shaded by the pen 105 is expressed by the following expression:

$$S\_opt(h) = \int_{(X=h1-h)}^{X=h2-h} F(x,\theta)dx \quad \text{(Expression 102)}$$

According to this expression, the area of a portion of the pen 105 overlapping a zone for light shading (retroreflective zone 100) is obtained by integrating the shape-defining Expression F (X, θ) over a predetermined range.

Now, it is assumed that the virtual height (level) of the coordinate input surface 104 is represented by h_in. In the present embodiment, the range of h is not (h≧h_in), but (h≧h0, provided that h0<h_in). In other words, the minimum value of h is equal not to h_in, but to h0 (h0<h_in). This is because the state of the pen being further pressed against the coordinate input surface 104 from the position h_in with its pen tip deformed is virtually regarded as a state of the pen tip being sunk below the coordinate input surface 104. Therefore, the position of the pen tip as a base point for X in Expression 101 is a virtual position where the pen tip which is not deformed is assumed to exist.

As described hereinbefore, in the present embodiment, the state (more specifically, the pen-up/pen-down state) of the indication tool 105 is determined based on a change in the degree of light shading. In order to use a change in the light-shaded area S_opt, which can be regarded as a change in the degree of light shading, so as to perform unique determination, a relationship of monotonous decrease is required to be maintained between the light-shaded area S_opt and the position of the indication tool 105 substantially perpendicular to the coordinate input surface 104. In other words, in the present embodiment, the S_opt value in Expression 102 monotonously decreases with increase in the height h of the pen 105.

When the pen tip is at the height h from the coordinate input surface 104 and the angle of inclination of the pen 105 is θ, the light-shaded area S_opt can be expressed by Expression 102, and the fact that the light-shaded area S_opt monotonously decreases with increase in the height h of the pen 105 can be expressed by the following Expression 103:

$$dS\_opt(h)/dh \leq 0 (h0 \leq h \leq h2) \quad \text{(Expression 103)}$$

Similarly, the light-shading amount S_elc, which is proportional to the light-shaded area S_opt, can be expressed by the following Expression 104:

$$dS\_opt(h)/dh < 0 (h0 \leq h \leq h2) \quad \text{(Expression 104)}$$

Figure 11:
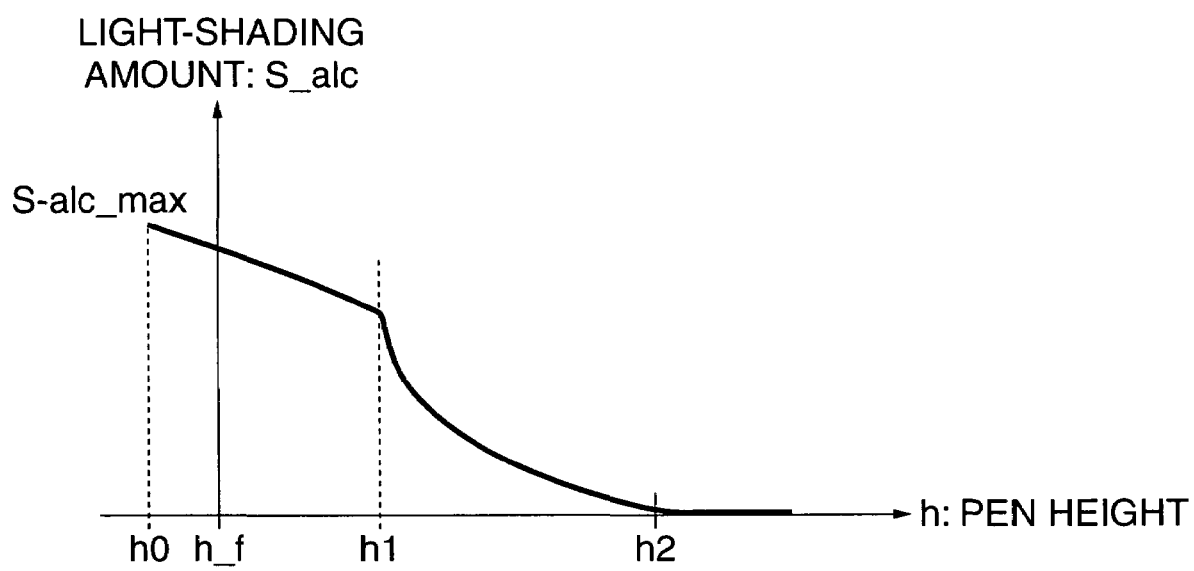
FIG. 11 is a graph showing a monotonous decrease in a light-shading amount detected on the light projected from the coordinate sensor units in FIG. 1.

Therefore, the light-shading amount S_elc also monotonously decreases with increase in the height h of the pen 105 (see FIG. 11).

By setting the light-shaded area S_opt and the light-shading amount S_elc as expressed by respective Expressions 103 and 104, the motion of the pen 105 perpendicular to the coordinate input surface 104 and the manner of change in the light-shading amount S_elc can be uniquely associated with each other.

The pen 105 used in the present embodiment is formed to have a thickness thereof progressively increasing rearward from its pen tip within a predetermined range as shown in FIG. 10. This is expressed by the following Expression 105:

$$d \cdot [F(\theta, X)]/dX > 0 \quad \text{(Expression 105)}$$

Figure 12:
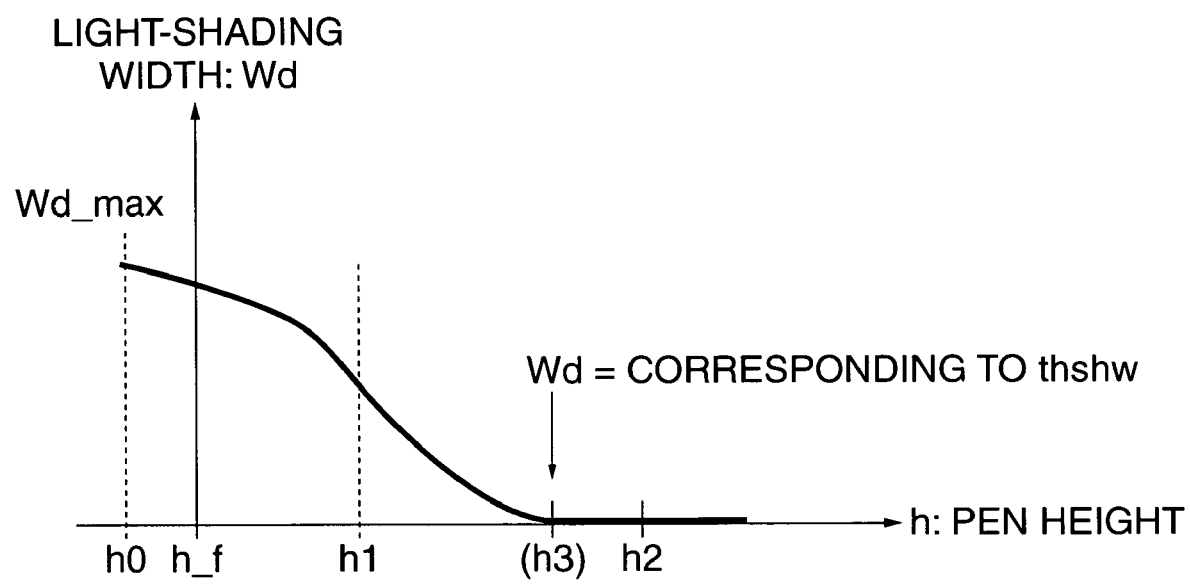
FIG. 12 is a graph showing a monotonous decrease in a light-shading width detected on the light projected from the coordinate sensor units in FIG. 1.

Now, a virtual height corresponding to the threshold value for detecting the light-shading width Wd is represented by h3 as shown in FIG. 12. Assuming that the pen tip is at the height h from the coordinate input surface 104, the light-shading width Wd in the relative light intensity distribution is expressed as a function of h, as follows:

$$Wd(h) \propto F(\theta, h3 - h) \quad \text{(Expression 106)}$$

Further, the following expression is derived from Expressions 105 and 106:

$$d \cdot Wd(h)/dh = d[F(\theta, h3-h)]/dh < 0 \quad \text{(Expression 107)}$$

This means that when the pen 105 is formed as expressed by Expression 105, the light-shading width Wd monotonously decreases with increase in the value h, as expressed by Expression 107 (see FIG. 12). The association of this expression with Expressions 103 and 104 gives the following Expression 108:

$$d \cdot Wd(h)/dh < 0 (h0 \leq h \leq h3, h3: \text{level corresponding to thsh} W) \quad \text{(Expression 108)}$$

Thus, similarly to the light-shading amount S_elc, the manner of change in the light-shading width Wd can be uniquely associated with the motion of the pen 105 perpendiculars to the coordinate input surface 104.

In the following, a description will be given of algorithms of the pen-up/pen-down determining function of the coordinate input device according to the present embodiment.

The algorithms employed in the present embodiment, which are configured based on Expressions 103, 104 and 108, will now be described with reference to FIGS. 13A to 17.

Figure 13A:
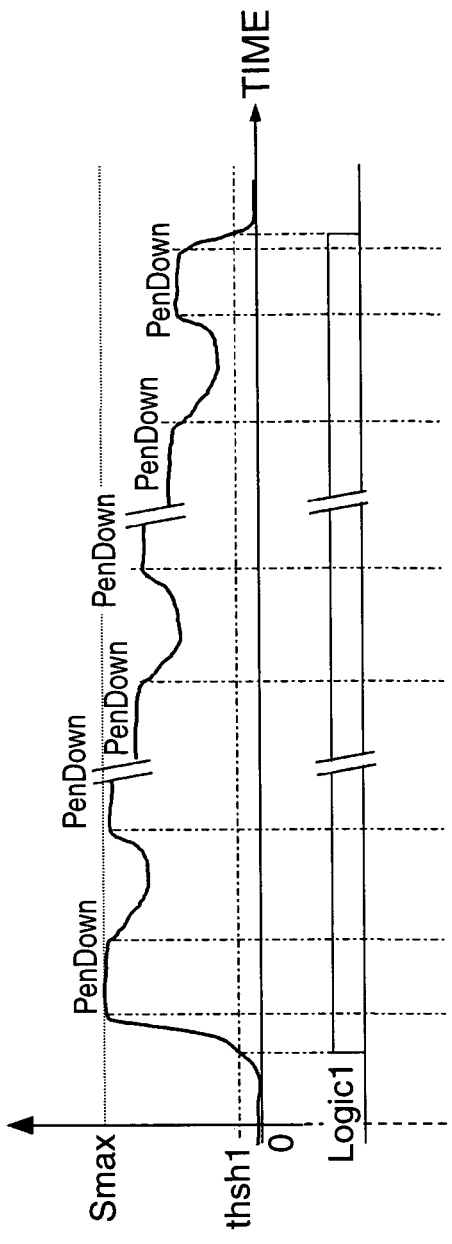
FIGS. 13A and 13B are graphs showing the relationship between the light-shading amount and time, which are useful in explaining a first algorithm of a control program for the coordinate input device according to the present embodiment.
Figure 13B:
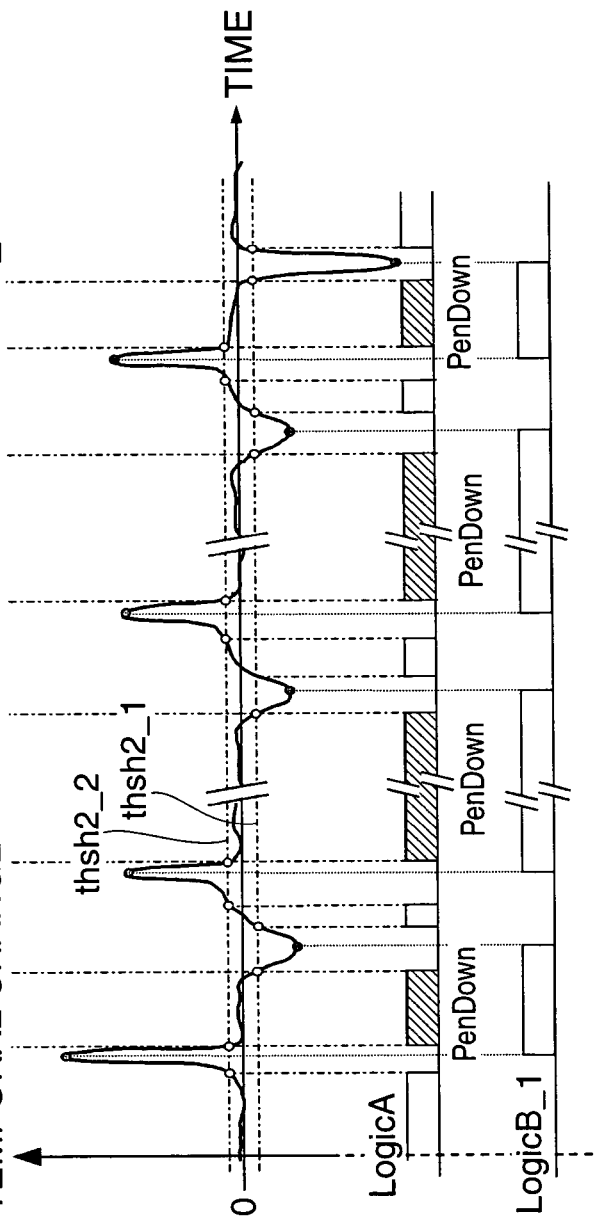
Figure 14A:
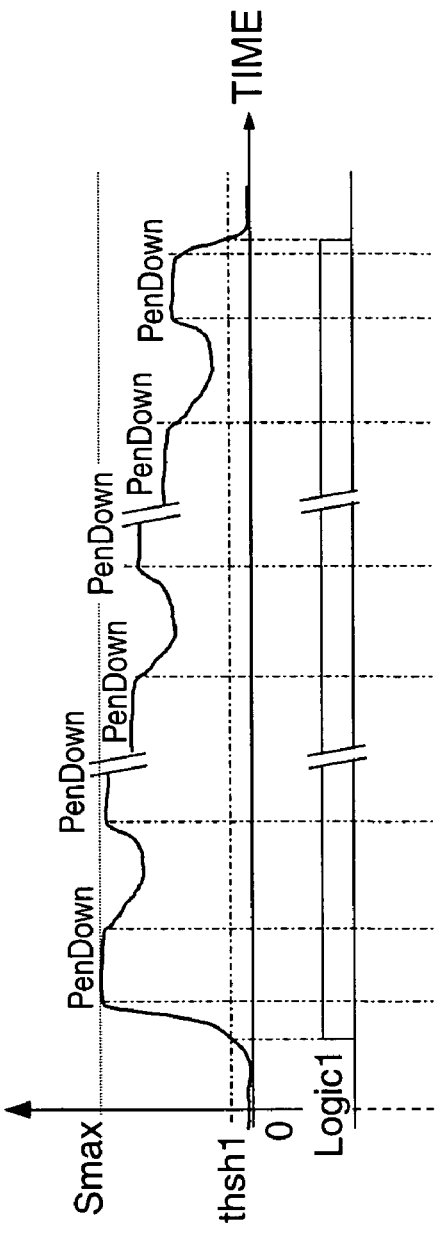
FIGS. 14A and 14B are graphs showing the relationship between the light-shading amount and time, which are useful in explaining a second algorithm of the control program for the coordinate input device according to the present embodiment.
Figure 14B:
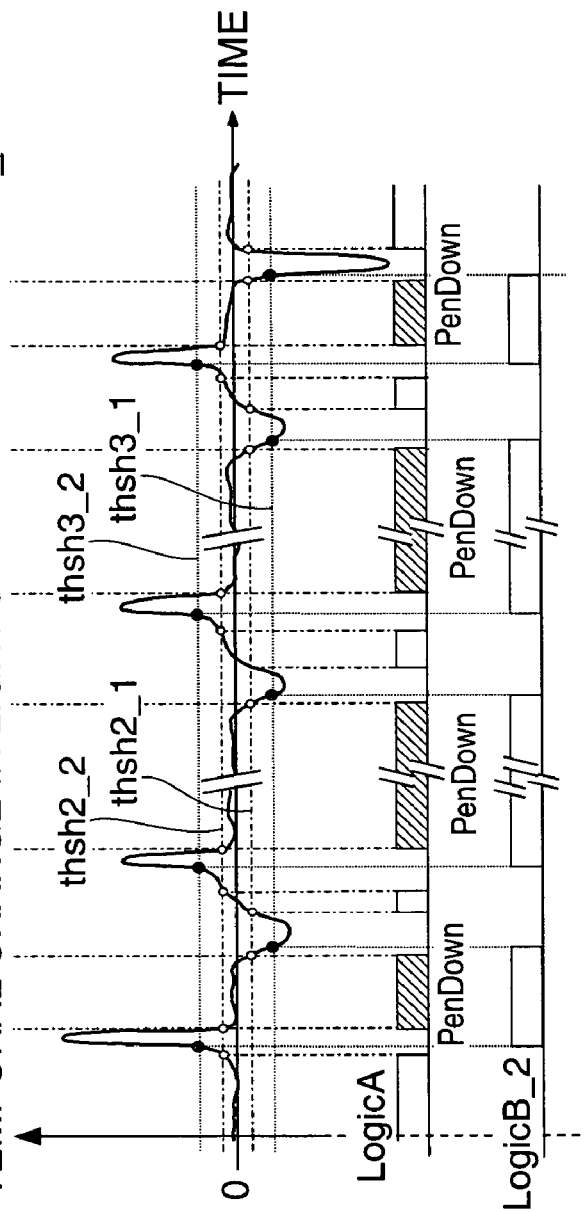
Figure 15A:
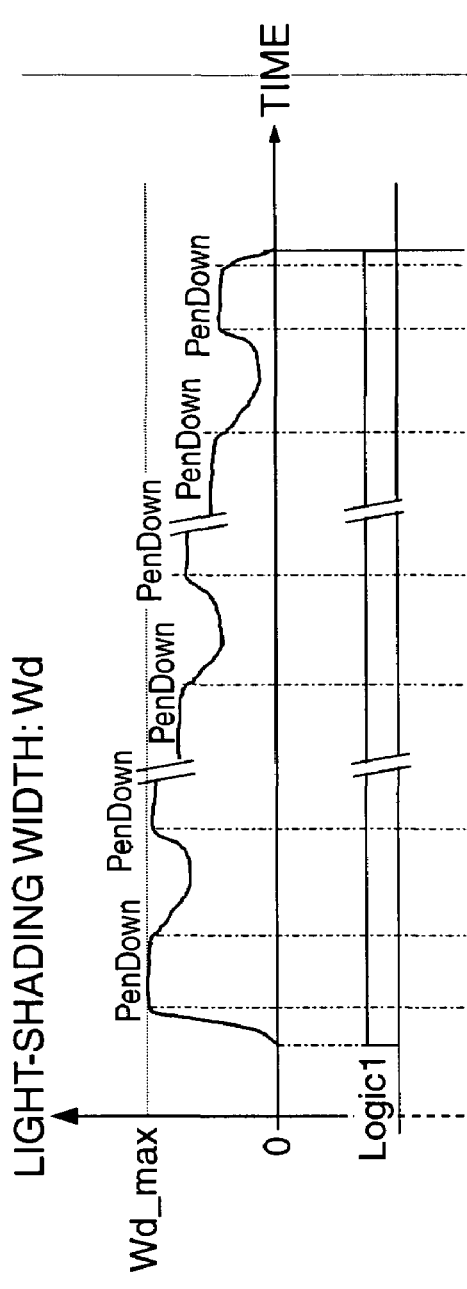
FIGS. 15A and 15B are graphs showing the relationship between the light-shading width and time, which are useful in explaining the first algorithm of the control program for the coordinate input device according to the present embodiment.
Figure 15B:
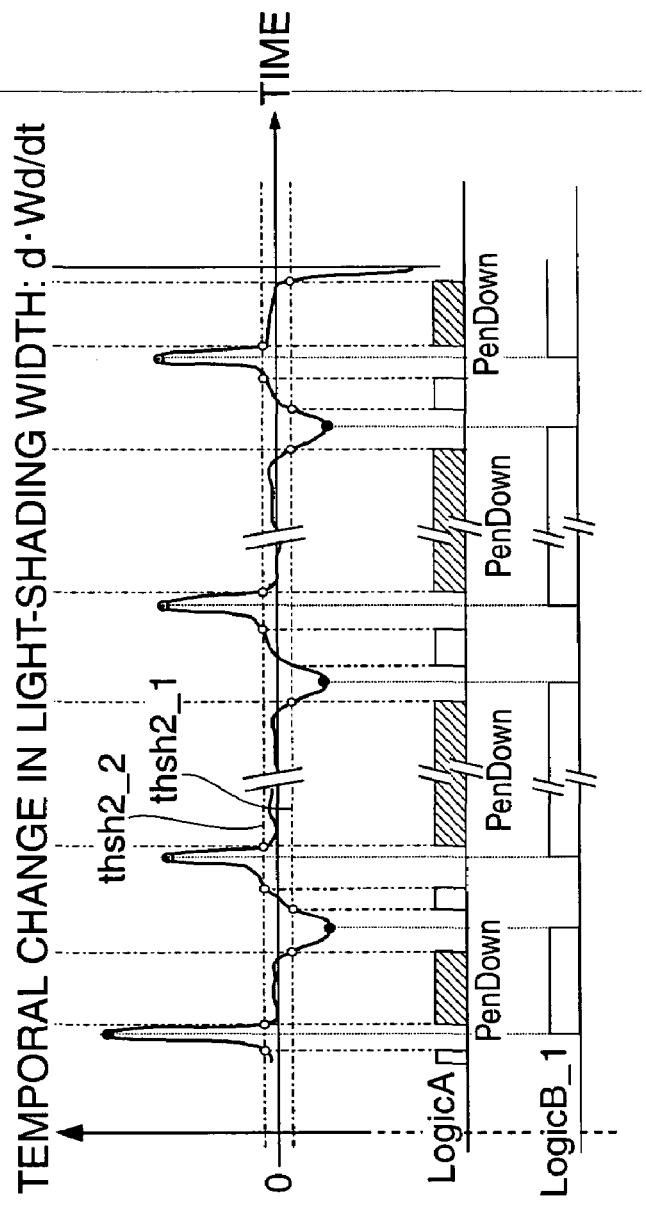
Figure 17:
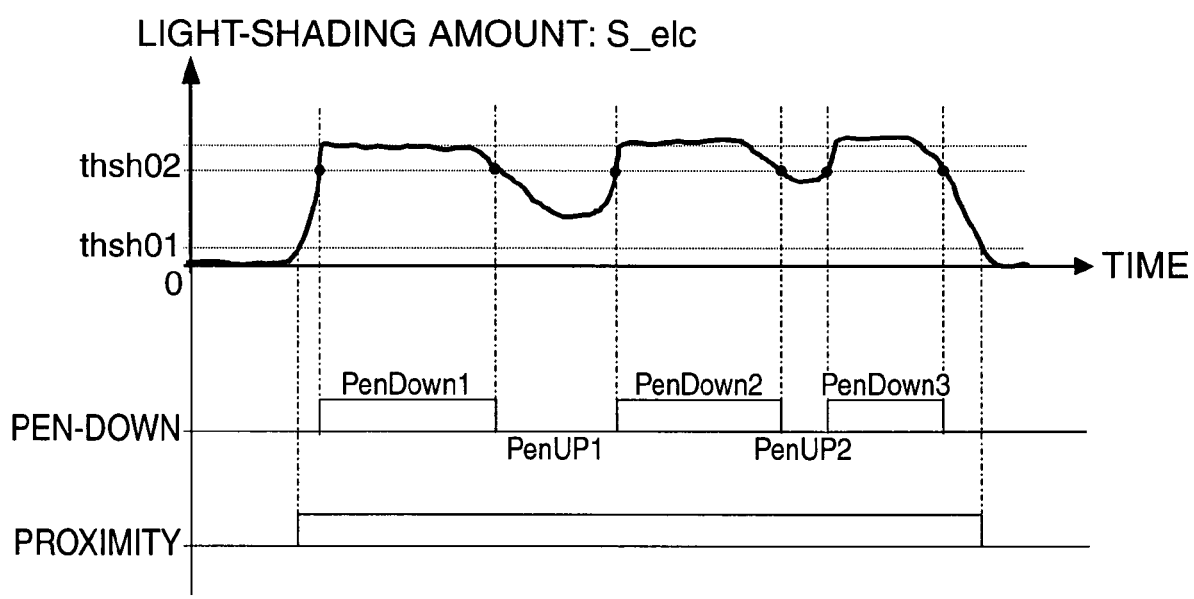
FIG. 17 is a graph useful in explaining a conventional pen-up/pen-down determining method.

FIGS. 13A and 13B are graphs showing the relationship between the light-shading amount S_elc and time, which are useful in explaining a first algorithm of a control program for the coordinate input device according to the present embodiment. FIG. 13A is a graph representing the light-shading amount S_elc as a function of time, while FIG. 13B is a graph representing the time derivative of the light-shading amount S_elc as a function of time so as to explain the first algorithm. FIGS. 14A and 14B are graphs showing the relationship between the light-shading amount S_elc and time, which are useful in explaining a second algorithm of the control program for the coordinate input device according to the present embodiment. FIG. 14A is a graph representing the light-shading amount S_elc as a function of time, while FIG. 14B is a graph representing the time derivative of the light-shading amount S_elc as a function of time so as to explain the second algorithm. Further, FIGS. 15A and 15B are graphs showing the relationship between the light-shading width Wd and time, which are useful in explaining the first algorithm of the control program for the coordinate input device according to the present embodiment. FIG. 15A is a graph representing the light-shading width Wd as a function of time, while FIG. 15B is a graph representing the time derivative of the light-shading width Wd as a function of time so as to explain the first algorithm. FIGS. 16A and 16B are graphs showing the relationship between the light-shading width Wd and time, which are useful in explaining the second algorithm of the control program for the coordinate input device according to the present embodiment. FIG. 16A is a graph representing the light-shading width Wd as a function of time, while FIG. 16B is a graph representing the time derivative of the light-shading width Wd as a function of time so as to explain the second algorithm. Further, FIG. 17 is a graph representing the light-shading amount S_elc as a function of time, which is useful in explaining a conventional pen-up/pen-down determining method.

Each of FIGS. 13A to 16B shows an example of state transition occurring in the sequence of a non-light-shaded state→a pen-up state→a pen-down state→a pen-up state→a pen-down state→a pen-state→a pen-down state→a pen-up state→a pen-down state→a non-light-shaded state.

The light-shading amount S_elc and the light-shading width Wd monotonously decrease with increase in the height h of the pen 105 perpendicular to the coordinate input surface 104 as already described, and therefore, by detecting a change in the light-shading amount S_elc or the light-shading width Wd, the motion of the pen 105 in the vertical direction can be detected indirectly.

First, a description will be given of the conventional pen-up/pen-down determining method, with reference to FIG. 17.

Conventionally, a first threshold value thsh 01 and a second threshold value thsh 02 are set. The first threshold value thsh 01 is used for determining whether or not there is light shading, and is set to a relatively small value. When the threshold value is exceeded, it is determined that there is effective light shading. The second threshold value thsh 02 is used for determining whether or not the pen is in the pen-down state, and is set to a value relatively close to the maximum value. When the threshold value is exceeded, it is determined that the pen is in the pen-down state.

A problem with this conventional pen-up/pen-down determining method is that the same threshold values are used for determination anywhere on the entire coordinate input surface. In general, in a coordinate input device of the above described kind, the above-defined S_elc_max or S_opt_max value varies depending on the direction of insertion of an indication tool at an inserting position thereof, as viewed from the coordinate sensor unit, the distance between the coordinate sensor unit and the position of insertion of the indication tool, and so forth, due to warpage of the entire device, deformation of the coordinate input surface, or insufficiency of the depth of field of the optical system. For this reason, excellent pen-up/pen-down determination cannot be always executed with the above-mentioned fixed threshold values.

To improve the above described method, a method can be envisaged in which the first threshold value thsh 01 and the second threshold value thsh 02 are set to respective optimal values selected in accordance with the position of insertion of the indication tool. However, this method is not practical because complicated computations are needed or the optimal values cannot be set uniquely.

The present embodiment makes it possible to realize a method which enables determination of the state (more specifically, the pen-up/pen-down state) of the indication tool 105 to be performed without any problem even when the S_elc_max value varies.

In the first algorithm, a first threshold value thsh 1 is provided for the light-shading amount S_elc, and a second threshold value thsh 2_1 and a third threshold value thsh 2_2 are provided for a temporal change dS_elc/dt in the light-shading amount. Further, a logic 1, a logic A, and a logic B_1 are defined as described hereinbelow, and pen-up/pen-down determination is performed based on these.

In the second algorithm, for the light-shading amount S_elc, the first threshold value thsh 1 is provided as in the first algorithm, and for the temporal change dS_elc/dt in the light-shading amount, not only the second threshold value thsh 2_1 and the third threshold value thsh 2_2, which are provided as in the first algorithm, but also a fourth threshold value thsh 3_1 and a fifth threshold value thsh 3_2 are provided. Further, the logic 1, the logic A, and a logic B_2 are defined as described hereinbelow, and pen-up/pen-down determination is performed based on these.

In the following, a description will be given of determining conditions in the present embodiment.

In the first and second algorithms, the logic 1 is for determining that there is practically effective light shading, and the logic A is for determining that a temporal change in the light-shading amount S_elc is small, i.e. that the level of the light-shading amount S_elc is flat with respect to time. The logics B_1 and B_2 are for adopting peak portions of the light-shading amount S_elc (where dS_elc/dt is decreasing) and rejecting bottom portions of the light-shading amount S_elc (where dS_elc/dt is increasing), from portions determined by the logic A, i.e. for adopting a portion of the light-shading amount S_elc within a time period defined between each time point dS_elc/dt becomes maximum and a time point dS_elc/dt becomes minimum for the first time thereafter, and rejecting the other portions of the light-shading amount S_elc.

As shown in FIG. 13A, in the first algorithm, the logic 1 is defined as follows:

The logic 1 is equal to "1" when $S\_elc \geq thsh\ 1$ holds; and the logic 1 is equal to "0" when $S\_elc < thsh\ 1$ holds. . . . Logical Definition 1

As shown in FIG. 13B, the logic A is defined as follows:

The logic A is equal to "1" when $thsh\ 2\_1 \leq dS\_elc/dt \leq thsh\ 2\_2$ holds; and the logic A is equal to "0" otherwise . . . Logical Definition A As shown in FIG. 13B, the logic B_1 is defined as follows:

The logic B_1 changes from "0" to "1" when dS_elc/dt assumes a maximal value; and the logic B_1 changes from "1" to "0" when dS_elc/dt assumes a minimal value. . . . Logical Definition B_1

Based on the logic 1, the logic A, and the logic B_1, the pen-down state (PenDown) and the pen-up state (PenUp) are determined using the following logical expressions. FIG. 13B shows that hatched portions are determined as the pen-down state.

$$PenDown = logic\ 1 \cap logic\ A \cap logic\ B\_1 \quad \text{(Expression 200)}$$

$$PenUp = logic\ 1 \cap (/PenDown) \quad \text{(Expression 201)}$$

The second algorithm is provided to make the definition of the logic B more stable, and as shown in FIG. 14B, the logic B_2 is defined as follows:

The preset value of the logic B2 is equal to "0";

the logic B_2 changes from "0" to "1" in a state of transition of $dS\_elc/dt \leq thsh\ 3\_2$ to $dS\_elc/dt > thsh\ 3\_2$; and the logic B_2 changes from "1" to "0" in a state of transition of $dS\_elc/dt \geq thsh\ 3\_1$ to $dS\_elc/dt \leq thsh\ 3\_1$ (thsh $3\_1 < thsh\ 2\_1 < 0 < thsh\ 2\_2 < thsh\ 3\_2$). . . . Logical Definition B_2

The logic B_2 is set as above, and similarly to the first algorithm, the pen-down state (PenDown) and the pen-up state (PenUp) are determined using the following logical expressions. FIG. 14B shows that hatched portions (PenDown) are determined as the pen-down state.

$$PenDown = logic\ 1 \cap logic\ A \cap logic\ B\_2 \quad \text{(Expression 302)}$$

$$PenUp = logic\ 1 \cap (/PenDown) \quad \text{(Expression 303)}$$

Although in the above description, a temporal change in the light-shading amount S_elc is an object to be determined, it is possible to determine a temporal change in the light-shading width Wd and similarly apply the first and second algorithms to the light-shading width Wd. The only point to be noted here is that the threshold value thsh 1 used in defining the logic 1 is equal to 0.

In the following, a description will be given of the algorithm using the light-shading width Wd.

As shown in FIG. 15A, in the first algorithm, the logic 1 is defined as follows:

The logic 1 is equal to "1" when $Wd \geq 0$ holds; and the logic 1 is equal to "0" when $Wd < 0$ holds. . . . Logical Definition 1

As shown in FIG. 15B, the logic A is defined as follows:

The logic A is equal to "1" when $thsh\ 2\_1 \leq wd/dt \leq thsh\ 2\_2$ holds; and the logic A is equal to "0" otherwise. . . . Logical Definition A As shown in FIG. 15B, the logic B_1 is defined as follows:

The logic B_1 changes from "0" to "1" when $d \cdot Wd/dt$ assumes a maximal value; and the logic B_1 changes from "1" to "0" when $d \cdot Wd/dt$ assumes a minimal value . . . Logical Definition B_1

Based on the logic 1, the logic A, and the logic B_1, the pen-down state (PenDown) and the pen-up state (PenUp) are determined using the following logical expressions. FIG. 15B shows that hatched portions (PenDown) are determined as the pen-down state.

$$PenDown = logic\ 1 \cap logic\ A \cap logic\ B\_1 \quad \text{(Expression 400)}$$

$$PenUp = logic\ 1 \cap (/PenDown) \quad \text{(Expression 401)}$$

The second algorithm is provided to make the definition of the logic B more stable, and as shown in FIG. 16B, the logic B_2 is defined as follows:

The preset value of the logic B_2 is equal to "0";

the logic B_2 changes from "0" to "1" in a state of transition of $d \cdot Wd/dt \leq thsh\ 3\_2$ to $d \cdot Wd/dt > thsh\ 3\_2$; and the logic B_2 changes from "1" to "0" in a state of transition of $d \cdot Wd/dt \geq thsh\ 3\_1$ to $d \cdot Wd/dt \leq thsh\ 3\_1$ (provided that $thsh\ 3\_1 < thsh\ 2\ 1 < 0 < thsh\ 2\_2 < thsh\ 3\_2$). . . . Logical Definition B_2

The logic B_2 is set as above, and similarly to the first algorithm, the pen-down state (PenDown) and the pen-up state (PenUp) are determined using the following logical expressions. FIG. 16B shows that hatched portions (PenDown) are determined as the pen-down state.

$$PenDown = logic\ 1 \cap logic\ A \cap logic\ B\_2 \quad \text{(Expression 402)}$$

$$PenUp = logic\ 1 \cap (/PenDown) \quad \text{(Expression 403)}$$

As described above, whichever of the temporal change in the light-shading amount S_elc and the temporal change in the light-shading width Wd may be determined, the first algorithm and the second algorithm make it possible to perform pen-down/pen-up determination.

Further, when a pen-down state (PenDown) lasts longer than a predetermined time period T0, the logic A and the logic B are forcibly set to "0" so as to prevent an erroneous operation.

The present embodiment makes it possible to detect a pen-down state and a pen-up (proximity) state by the above described method.

Thus, it is possible to realize the same function as is provided in a device equipped with the indication tool 105 having a pen tip switch and means for communication therewith, for detection of a pen-down state and a pen-up (proximity) state.

A specific example of the present invention will be described in detail based on the above described embodiment.

In the following, a description will be given of the hardware configuration of the present example.

Figure 18:
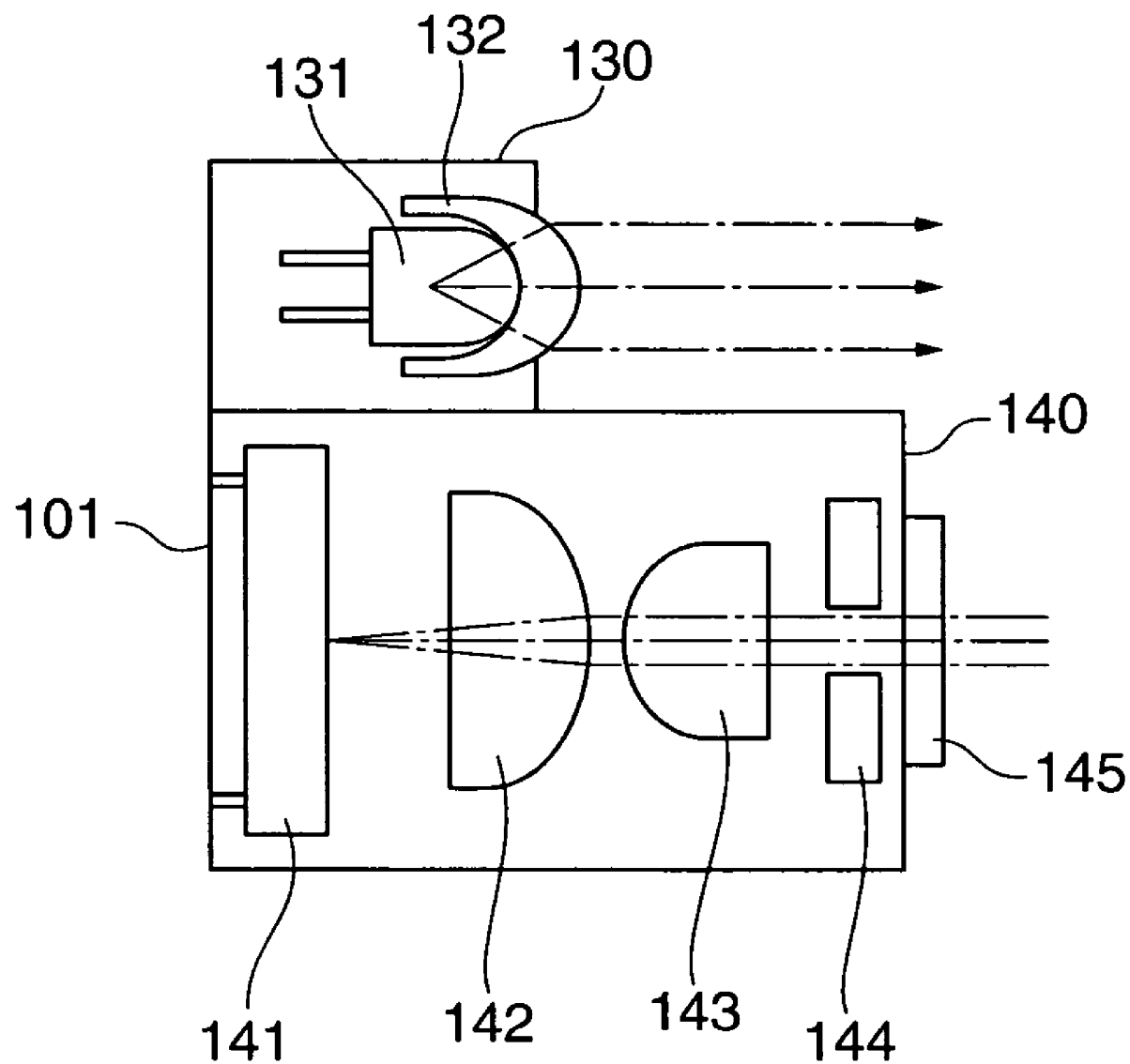
FIG. 18 is a cross-sectional view showing the construction of the coordinate sensor unit in FIG. 1.
Figure 19A:
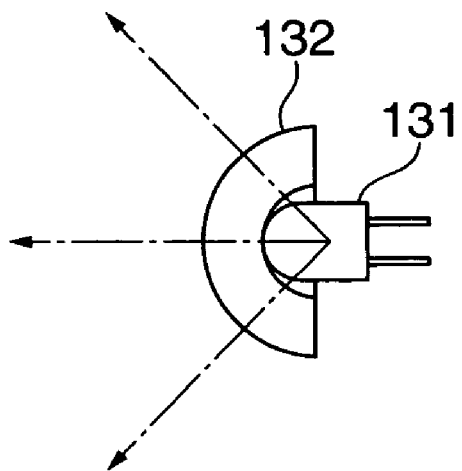
FIGS. 19A to 19C are fragmentary views showing details of the construction of the coordinate sensor in FIG. 1.
Figure 19B:
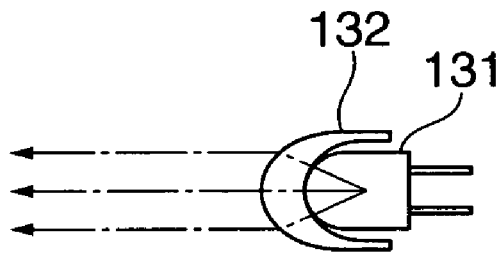
Figure 19C:
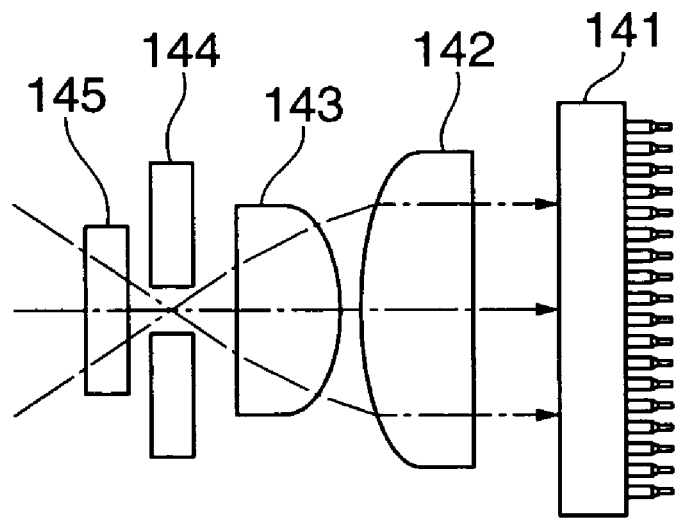
Figure 20:
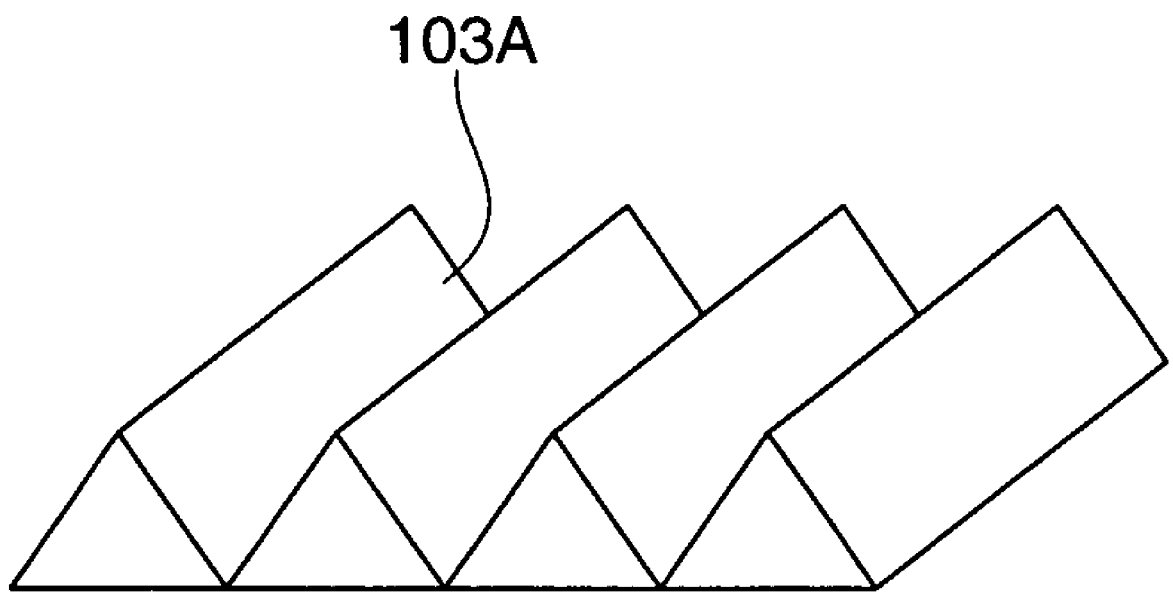
FIG. 20 is an enlarged fragmentary view of a retroreflective member appearing in FIG. 1.
Figure 22:
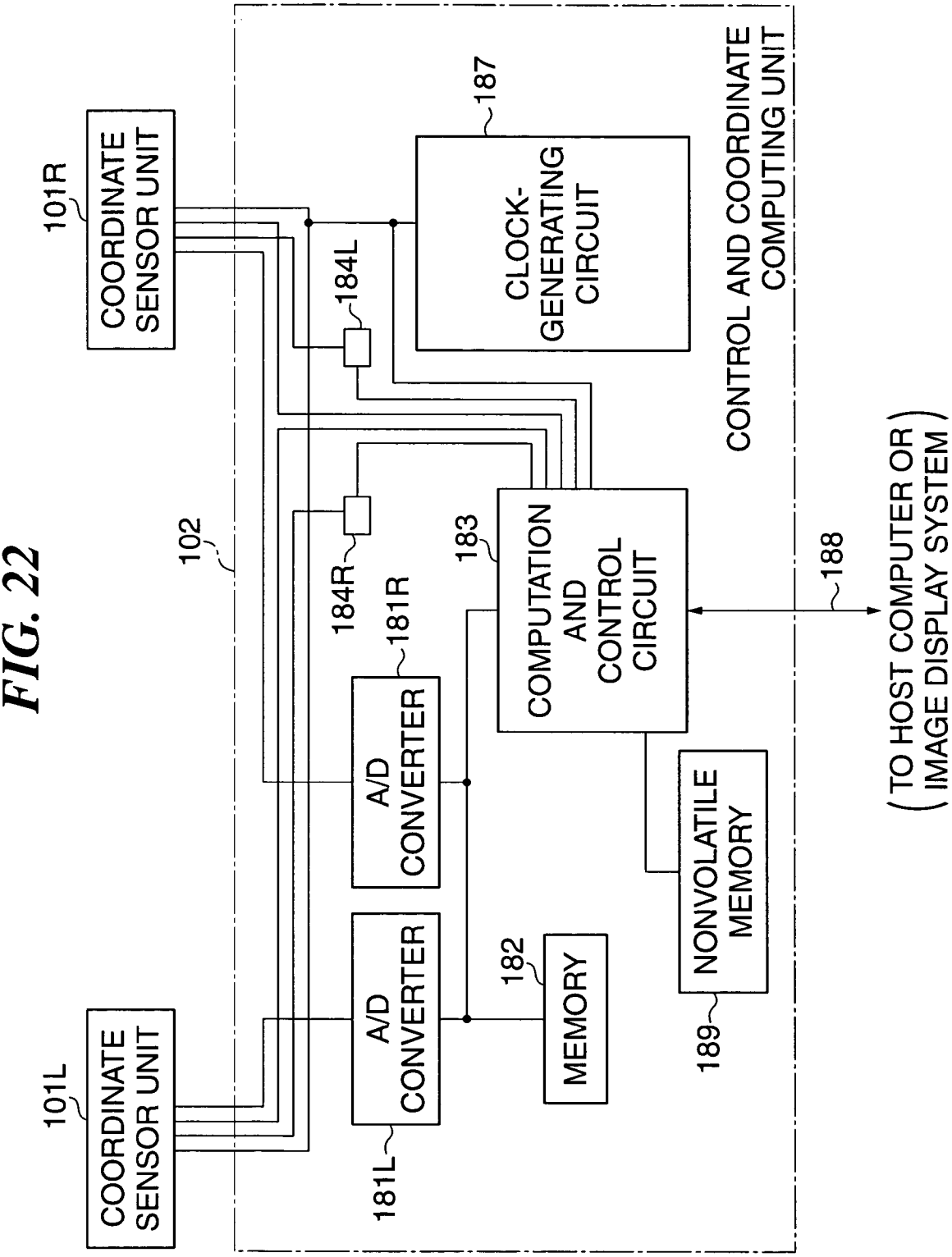
FIG. 22 is a block diagram showing the internal configuration of a control and coordinate computing unit appearing in FIG. 1.

In the hardware configuration of a coordinate input device according to the present example, the coordinate sensor unit 101L (101R) schematically shown in FIGS. 1 and 2 is configured as shown in FIGS. 18 and 19A to 19C, the retroreflective member 103 is configured as shown in FIG. 20, and the control and coordinate computing unit 102 is configured as shown in FIG. 22. Now, these component parts will be described in detail.

FIG. 18 is a cross-sectional view showing the construction of the coordinate sensor unit 101L (101R) in FIG. 1, as viewed horizontally to the coordinate input surface 104. FIGS. 19A to 19C are views showing details of the construction of the coordinate sensor unit 101L (101R). FIG. 19A is a top plan view of the light-projecting section 130 (as viewed vertically to the coordinate input surface 104), FIG. 19B is a side view of the light-projecting section 130 (as viewed horizontally to the coordinate input surface 104), and FIG. 19C is a top plan view of the light-receiving section 140 (as viewed vertically to the coordinate input surface 104).

The coordinate sensor unit 101L (101R) is comprised of the light-projecting section 130 and the light-receiving section 140, which are disposed one upon the other as shown in FIG. 18. The distance between the optical axis of the light-projecting section 130 and that of the light-receiving section 140 has only to be set within a range within which reflected light can be positively detected depending on the angle characteristics of the retroreflective member 103.

The light-projecting section 130 is provided with an infrared LED 131 for projecting infrared rays and a light-projecting lens 132. The light-projecting section 130 is preferably formed of a plurality of LEDs different in wavelength. As shown in FIG. 19A, rays emitted by the LED 131 are projected through the light-projecting lens 132 in a fan shape over an angle range of approximately 90 degrees about a location where the LED 131 is disposed and in parallel with the coordinate input surface 104. When the rays emitted by the LED 131 are viewed horizontally to the coordinate input surface 104, they are observed as a vertically limited light flux as shown in FIG. 19B. The rays are mainly projected onto the retroreflective member 103.

As shown in FIG. 19C, the light-receiving section 140 is comprised of a one-dimensional line CCD 141, lenses 142 and 143 as a condensing optical system, a diaphragm 144 for restricting the incident direction of incident light, and an infrared filter 145 for preventing incidence of a visible light or other lights in undesired wavelength regions. The line CCD 141 can also be implemented by a CMOS-based line CCD.

The rays projected from the light-projecting section 130 are reflected by the retroreflective member 103, and passed through the infrared filter 145 and the diaphragm 144 to form an image on the detection surface of the line CCD 141 via the condenser lenses 142 and 143. More specifically, reflected rays reflected from the coordinate input surface over an angle range of approximately 90 degrees pass through the condenser lenses 142 and 143 to form an image on pixels of the CCD detection surface which are dependent on the incident angles of the respective rays, whereby a distribution of light amounts associated with respective incident angles is obtained. That is, pixel numbers of the line CCD 141 represent angle information.

Figure 21:
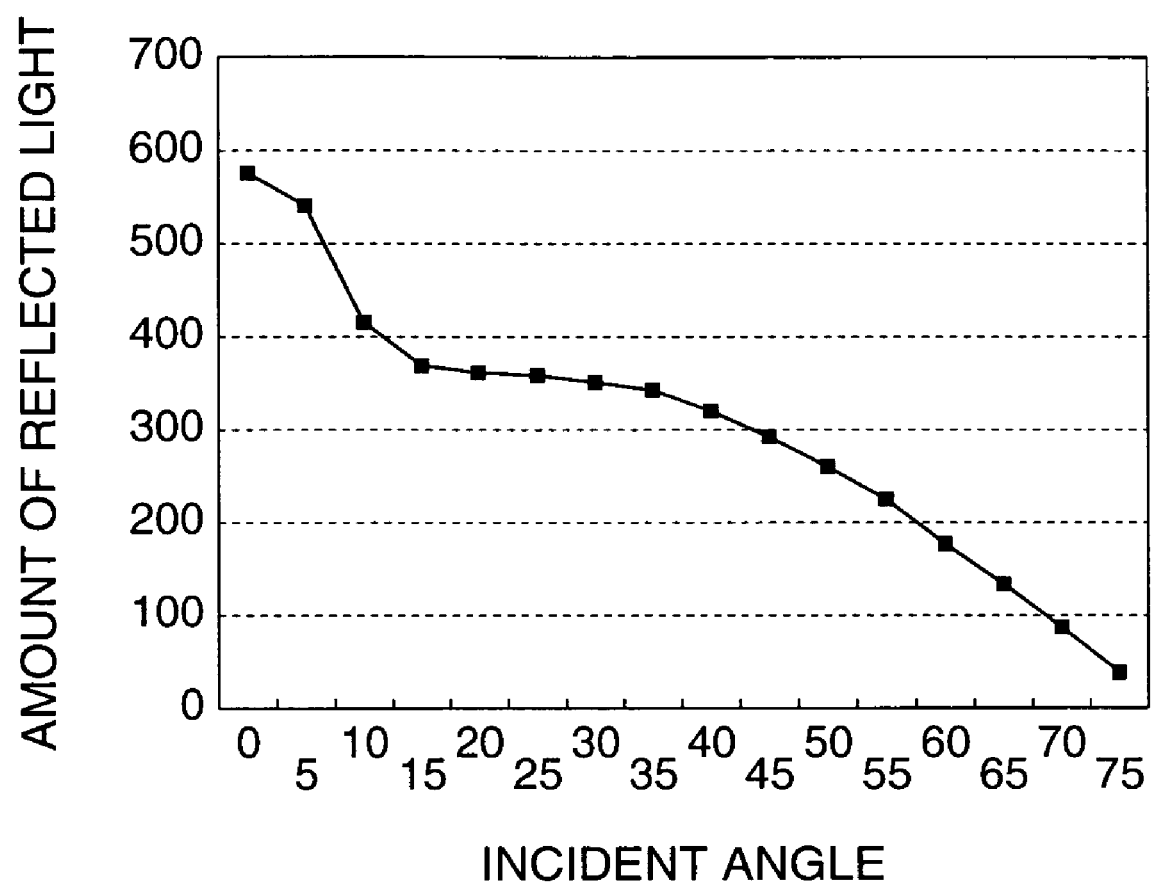
FIG. 21 is a graph showing incident angle characteristics of reflected light in the case where the retroreflective member in FIG. 1 is formed to have a flat reflective surface.

FIG. 20 is an enlarged fragmentary view of the retroreflective member 103 in FIG. 1, and FIG. 21 is a graph showing incident angle characteristics of reflected light on the assumption that the retroreflective member 103 in FIG. 1 is formed to have a flat reflective surface.

The retroreflective member 103 has reflection characteristics with respect to incident angles. If the retroreflective member 103 in FIG. 1 were formed to have a flat reflective surface, the incident angle characteristics shown in FIG. 21 are obtained. After the incident angle of reflected light from the retroreflective member 103 exceeds approximately 45 degrees, the amount of the reflected light becomes smaller so that in cases like the present example where the presence of a light-shading member and the absence of the same need to be distinguished from each other, it is difficult to clearly distinguish therebetween.

The total light intensity is determined by light projection intensity of the light-projecting section 130, the distance between the light-projecting section 130 and the retroreflective member 103, the reflectance of the retroreflective member 103 (the incident angle and the width of the retroreflective member 103), and the illuminance of the image forming system (cosine fourth-power law). When the total light intensity is insufficient, it can be envisaged that the light projection intensity is increased. However, in the case where the distribution of the total light intensity is excessively non-uniform, when light from a portion with a high light intensity is received, the CCD 141 of the light-receiving section 140 can be saturated, and therefore there is a limit to increase of the light projection intensity.

As a solution to this problem, it can be envisaged that the reflection distribution of the retroreflective member 103 is made as uniform as possible to thereby increase the intensity of light incident on parts of the retroreflective member 103 corresponding to weak portions of the light intensity distribution. To distribute light intensity more uniformly with respect to the directions of the incident angles of incident rays, the retroreflective member 103 is formed by a member 103A shaped, as shown in FIG. 20, in a manner such that a multiplicity of triangular prisms are arranged side by side, and the member 103A is affixed to the frame-like device walls surrounding the coordinate input surface 104. This makes it possible to improve the incident angle characteristics of the retroreflective member 103. The angles of the triangular prisms have only to be determined according to the reflection characteristics of the retroreflective member 103, and it is preferred that its pitch is set below the detection resolution of the line CCD 141.

FIG. 22 is a block diagram showing the internal configuration of the control and coordinate computing unit 102 in FIG. 1.

A control signal for the CCD 141, a clock signal for the CCD 141, an output signal from the CCD 141, and a drive signal for the light-projecting LED 131 are transmitted between the control and coordinate computing unit 102 and the coordinate sensor units 101L and 101R. The control signal for the CCD 141 is output from a computation and control circuit 183 implemented by a one-chip microcomputer or the like, for controlling the shutter timing of the CCD 141, the output of data, and so forth.

The clock signal for the CCD 141 is sent from a clock-generating circuit 187 to the coordinate sensor units 101L and 101R, and at the same time also input to the computation and control circuit 183, for carrying out various control operations in timing synchronous with the operation of the CCD 141. The drive signal for the light-projecting LED 131 is supplied from the computation and control circuit 183 to the light-projecting LEDs 131 of the coordinate sensor units 101L and 101R via respective LED-driving circuits 184L and 184R.

Detection signals output from the CCD 141 of the light-receiving sections 140 of the coordinate sensor units 101L and 101R are input to A/D converters 181L and 181R and then converted to digital data under the control of the computation and control circuit 183. The digital data after the conversion is stored in a memory 182 and used for calculating incident angles. The computation and control circuit 183 determines coordinate values from the calculated incident angles and outputs the coordinate values to an external host computer or the like via a serial interface 188.

In the following, a description will be given of the outline of an overall process.

First, a description will be given of the outline of a sequence from exposure of the CCD 141 to light emitted from the LED 131 best shown in FIG. 18 to pen-up/pen-down determination with reference to FIG. 23.

Figure 23:
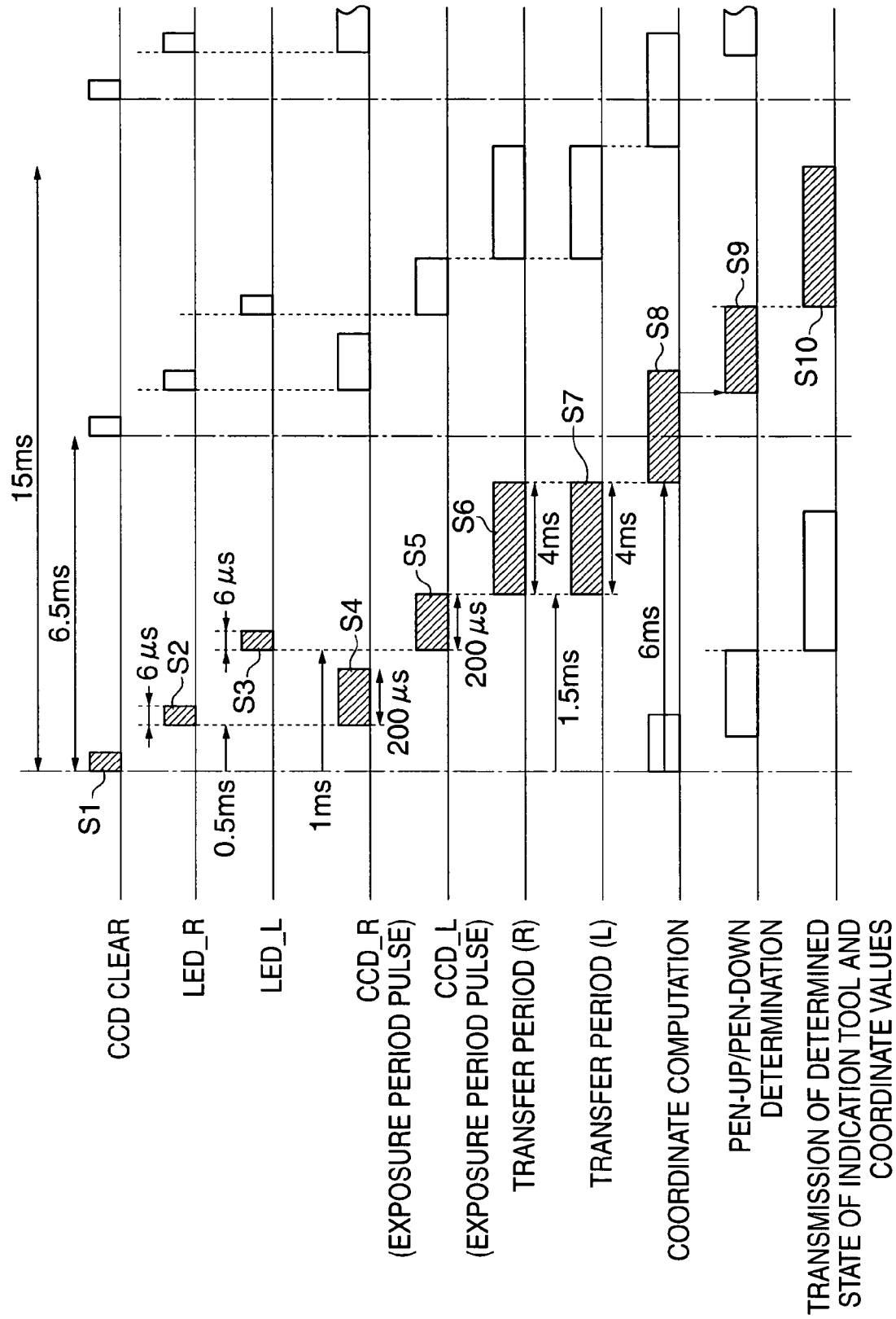
FIG. 23 is a timing chart showing the overall timing sequence of the coordinate input device in FIG. 1.

FIG. 23 is a timing chart showing the overall timing sequence of the coordinate input device in FIG. 1.

A start pulse "CCD clear" (step S1 in FIG. 23) is given at predetermined time intervals (e.g. 6.5 ms). Exposure period pulses CCD_L and CCD_R (steps S4 and S5 in FIG. 23) indicative of an exposure period of the CCDs 141, and LED light emission pulses LED_L and LED_R (steps S2 and S3 in FIG. 23) generated within the respective exposure periods are given with reference to the start pulse "CCD clear".

The LED 131 is driven to emit light, and the CCDs 141 are exposed to the light over the exposure period indicated by the pulses CCD_L and CCD_R, whereafter electric charge obtained by the exposure is transferred as light intensity distribution data simultaneously from the coordinate sensor units 101L and 101R to the computation and control circuit 183 and the memory 182 (steps S6 and S7 in FIG. 23). Then, in the computation and control circuit 183, first, a light-shaded position in the light intensity distribution data is detected based on the light intensity distribution data, and subsequently, calculation of the XY coordinates of the light-shaded position (step S8 in FIG. 23) and determination of the state of the indication tool 105 (step S9 in FIG. 23) are performed, followed by data of the calculated XY coordinates and the determined state being transmitted to the external computer (step S10 in FIG. 23).

Next, a description will be given of a method of detecting a light-shaded position based on a signal data row (light intensity distribution) read out from the CCD 141.

When there is no input by light shading, light intensity distribution data as shown e.g. in FIG. 4 is obtained from signals read from the respective CCDs 141 of the coordinate sensor units 101L and 101R. Of course, this distribution varies depending on the directional properties of the LEDs and the like of the light-projecting section 130, the characteristics of the retroreflective sheet, directivity on the light-receiving side, reflection from the surface of an image display screen, deformation of the reflective surfaces, and aging of the same (e.g. stains on the reflective surfaces).

In FIG. 4, the ordinate represents output voltage of the CCD 141, and light intensity increases in a direction from B to A in FIG. 4. Data thus output from the CCD 141 are sequentially subjected to analog-to-digital conversion by the A/D converters 181L and 181R and are captured by the computation and control circuit 183.

FIG. 5 shows an example of output in the case where input is performed by light-shading means, such as the indication tool 105 or a finger, i.e. the case where reflected light is blocked. A portion C of the wave in FIG. 5 corresponds to a portion shaded from reflected light (i.e. a light-shaded position), and the light intensity is low only in the position of this portion. Detection of the light-shaded position is performed based on a change in light intensity distribution between a state where light shading is detected and a state where light shading is not detected.

More specifically, a state where there is no input (no light shading) as shown in FIG. 4 is stored in advance as an initial state, and in each one-sample sequence, it is detected, based on the difference from the initial state, whether or not there is such a change as shown in FIG. 5. In this case, only when it is determined that there is a change, a portion corresponding to the change is regarded as a light-shaded position, and computed.

Then, data of the light-shaded position is subjected to predetermined conversion, whereby the incident angle of light incident on the CCD 141 is obtained.

Figure 24:
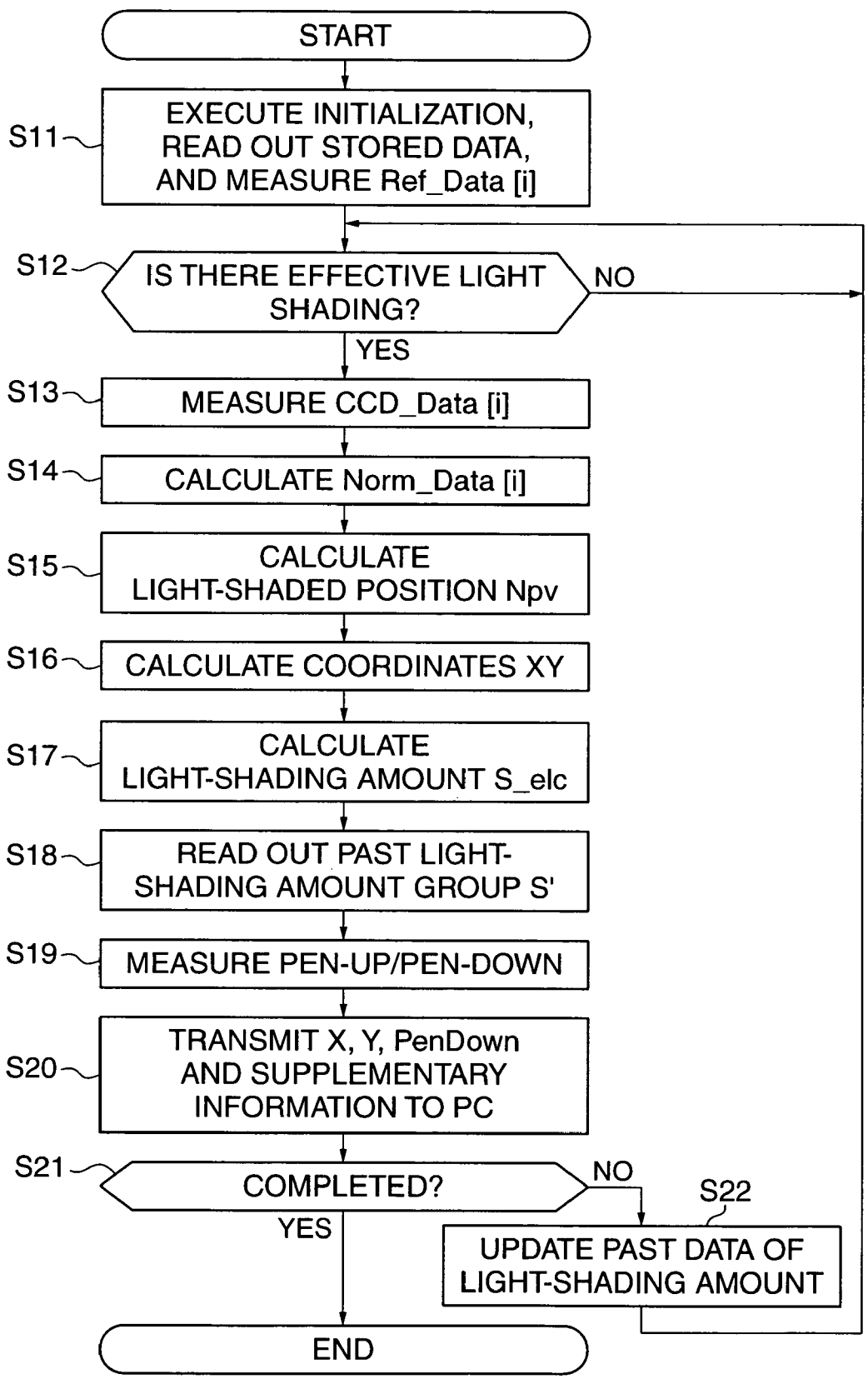
FIG. 24 is a flowchart showing the overall process carried out by the coordinate input device in FIG. 1.

In the following, a detailed description will be given of the overall process carried out by the coordinate input device in FIG. 1, with reference to FIG. 24. FIG. 24 is a flowchart showing the overall process carried out by the coordinate input device in FIG. 1.

The following description will be given using valid data of the retroreflective zone 100 corresponding to one of the two coordinate sensor units 101L and 101R, but it is apparent that data of the other is processed similarly.

First, the line CCD 141 of one of the two coordinate sensor units 101L and 101R is defined as a representative, as follows:

The number of effective pixels of the line CCD 141 is represented as N, and physical quantities distributed according to the pixel numbers are expressed by a matrix with elements i (i=1 to N), as follows:

Blind_data [i]: a dark noise distribution obtained by the line CCD 141 when there is no light projection from the light-projecting section 130

Ref_data_abs [i]: a light intensity distribution obtained by the line CCD 141 when the light-projecting section 130 projects light and there is no light shading (no input by the indication tool 105 or a finger)

CCD_data_abs [i]: a light intensity distribution obtained by the line CCD 141 when the light-projecting section 130 projects light and there is light shading (input by the indication tool 105 or a finger).

Further, a result obtained by subtracting Blind_data [i] from each of Ref_data_abs [i] and CCD_data_abs [i] is defined as follows:

Ref_data [*i*]=Ref_data_abs [*i*]−Blind_data [*i*]

CCD_data [*i*]=CCD_data_abs [*i*]−Blind_data [*i*]

Furthermore, relative intensity distribution Norm_data [i] is defined as the ratio of CCD_data [i] to Ref_data [i] and expressed as follows:

Norm_data [i]=CCD_data [i]/Ref_data [i]

In the first step S11 in FIG. 24, the following processing is performed.

When the power is turned on, first in a state where there is no input, an output from the CCD 141 is subjected to A/D conversion without light projection from the light-projecting section 130, and then the resulting output value is stored as Bas_data [i] in the memory 182. Bas_data [i] is used as data for evaluating variations or the like in the sensitivity of the CCD 141, and is data (broken line) corresponding to the level B shown in FIGS. 4 and 5.

Next, a light amount distribution formed in a state where light is projected from the light-projecting section 130 is stored. The light amount distribution is data indicated by the solid line in FIG. 4 and represented as Ref_data_abs [N].

Then, in order to correct unevenness or variations in the sensitivity of the CCD 141, Ref_data [i] is calculated as follows:

Ref_data [i]=Ref_data_abs [i]−Blind_data [i]  (Expression 501)

Thus, basic initial setting is completed.

In the following step S12, effective light shading is awaited, and when effective light shading occurs, a normal sampling loop is started.

In the normal sampling loop, first, CCD_data_abs [N] is measured in a step S13. Then, in order to correct unevenness or variations in the sensitivity of the CCD 141, CCD_data [i] is calculated as follows:

CCD_data [i]=CCD_data_abs [i]−Blind_data [i]  (Expression 502)

In the following step S14, Norm_data [i] is calculated as a physical quantity purely representing the state of light shading, as follows (see FIG. 6):

Norm_data [i]=CCD_data [i]/Ref_data [i]  (Expression 503)

In the above described way, by always subtracting an intensity distribution in the case where there is no light projection from the absolute intensity distribution, it is possible to avoid adverse effects due to unevenness or variations in the sensitivity of the CCD 141. Further, by calculating an intensity distribution in the case where there is light shading by normalizing the same with the intensity distribution in the case where there is no light shading as a reference, it is possible to perform the calculation without being adversely affected by changes in luminance distribution on the light-projecting side or changes in the optical system including the retroreflective member 103.

In the present example, based on the thus obtained relative intensity distribution Norm_data [i], a light-shaded position (pixel number) Npv is calculated in the following step S15.

In the following, a detailed description will be given of a method of calculating the light-shaded position Npv from the relative intensity distribution Norm_data [i] (step S15).

First, by applying a threshold value Vth_posi to the relative intensity distribution data Norm_data [i], the center between a pixel number corresponding to a rising edge of the data with respect to the threshold value Vth_posi and a pixel number corresponding to a falling edge of the same with respect to the threshold value Vth_posi is obtained as an input pixel, and the incident angle is determined.

Figure 26:
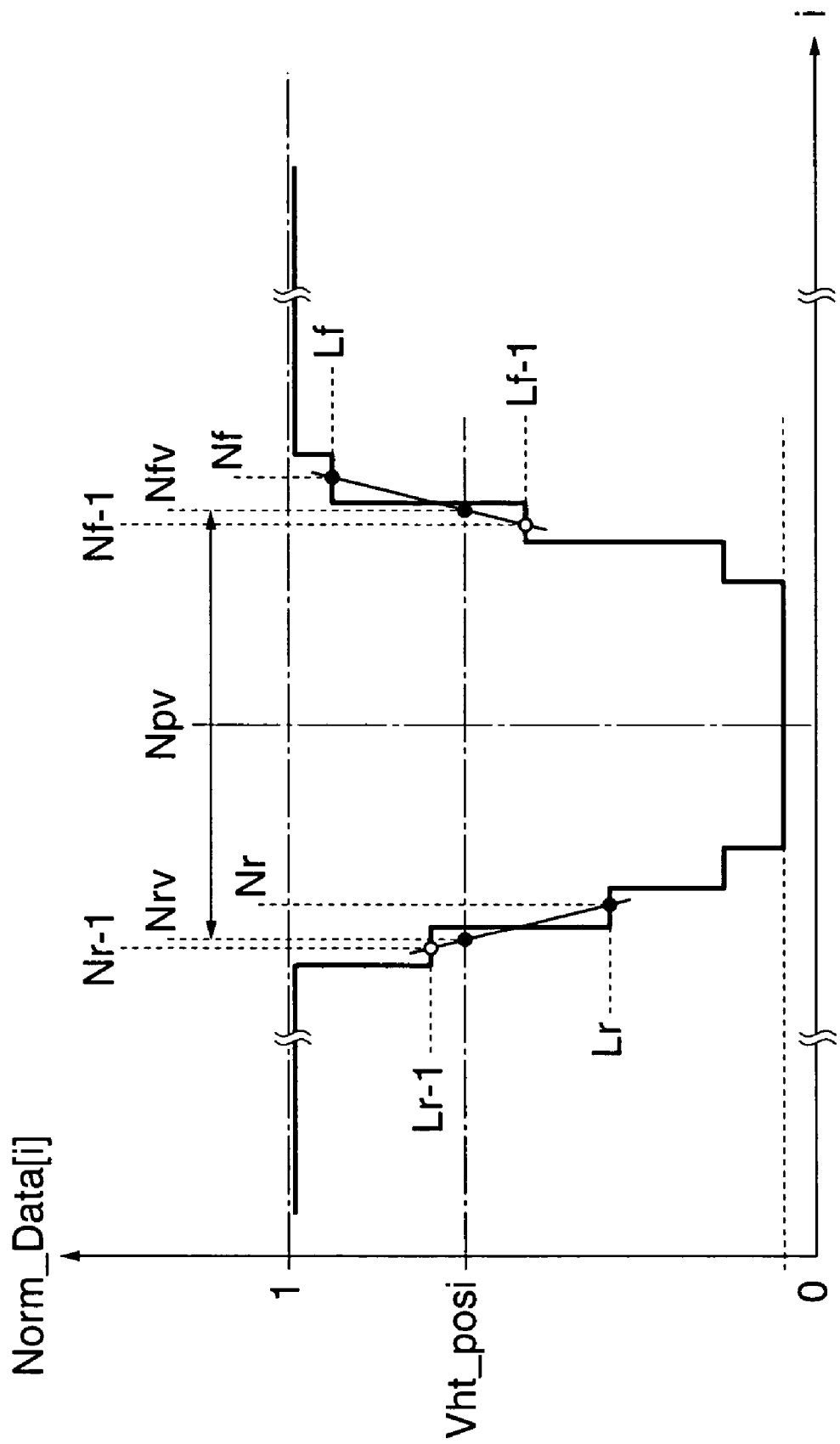
FIG. 26 is an enlarged view showing the light-shaded portion, which is useful in explaining pixel-by-pixel signals on a coordinate input surface in FIG. 1.

FIG. 6 is a graph showing the relative intensity distribution normalized based on a light intensity distribution formed in the case where light rays projected from the respective coordinate sensor units in FIG. 1 are not blocked or shaded, and FIG. 26 is an enlarged diagram showing an enlarged light-shaded portion, which is useful in explaining pixel-by-pixel signals on the coordinate input surface 104 in FIG. 1.

Now, let it be assumed that when a light-shaded position is detected by applying the threshold value Vth_posi; data of the light-shaded portion becomes higher than the threshold value Vth_posi between a (Nr−1)-th pixel and a Nr-th pixel, as a falling edge of the waveform as viewed in the left-to-right direction, and becomes lower than the threshold value Vth_posi between a (Nf−1)-th pixel and a Nf-th pixel as a rising edge of the waveform.

Now, a center pixel Np may be calculated as follows:

Np=Nr+(Nf−Nr)/2

However, this calculation makes the minimum resolution equal to the interval between the pixels (pixel interval) (integer), i.e. a value quantized based on the pixel pitch. To overcome this problem and achieve a more precise detection, a point where a straight line connecting between the level of the Nr-th pixel and that of the (Nr−1)-th pixel crosses the threshold value and a point where a straight line connecting between the level of the Nf-th pixel and that of the (Nf−1)-th pixel crosses the threshold value are each calculated as a virtual pixel number expressed using a decimal.

Assuming that the level of the Nr-th pixel is Lr and that of the (Nr−1)-th pixel is Lr−1, and that the level of the Nf-th pixel is Lf and that of the (Nf−1)-th pixel is Lf−1, the virtual pixel numbers Nrv and Nfv can be calculated, respectively, as follows:

Nrv=Nr−1+(Vth_posi−Lr−1)/(Lr−Lr−1)

Nfv=Nf−1+(Vth_posi−Lf−1)/(Lf−Lf−1)

As a result, a virtual center pixel S is determined as follows:

Npv=Nrv+(Nfv−Nrv)/2 wherein Npv represents the very light-shaded position obtained from the present waveform.

To calculate a virtual center pixel number based on pixel numbers and their levels as described above makes it possible to detect a light-shaded position with a higher resolution.

To calculate the actual coordinate value from the obtained center pixel number the center pixel number has to be converted to angle information.

In an actual coordinate calculation described in detail hereinafter, it is more preferable to determine the value of the tangent of the angle rather than the angle itself. Conversion of a pixel number to a value tan θ is performed using a table or a conversion formula.

Predetermined data is obtained by actual measurement, and an approximate expression is prepared for the data. Pixel number-to-tan θ conversion is performed using the approximate expression.

If a high-order polynomial is used as the conversion formula, accuracy can be ensured. In this case, the order may be determined in view of computational capability and required accuracy. For example, when a quintic polynomial is used, six coefficients are needed, so that the coefficient data is only required to be stored in a nonvolatile memory 189 or the like e.g. prior to shipment.

Now, assuming that the quintic polynomial has coefficients L5, L4, L3, L2, L1 and L0, tan θ can be expressed as follows:

tan θ=((((L5*Npv+L4)*Npv+L3)*Npv+L2)*Npv+L1)*Npv+L0

By carrying out the same calculation for each of the coordinate sensor units 101L and 101R, it is possible to determine angle data associated therewith. Although in the above example, tan θ is calculated, the angle itself may be determined first, and then tan θ may be calculated.

In the following, a detailed description will be given of a method of calculating coordinates from the light-shaded position (step S16).

In the step S16, coordinates are calculated from the data of the incident angle obtained as described above.

Figure 27:
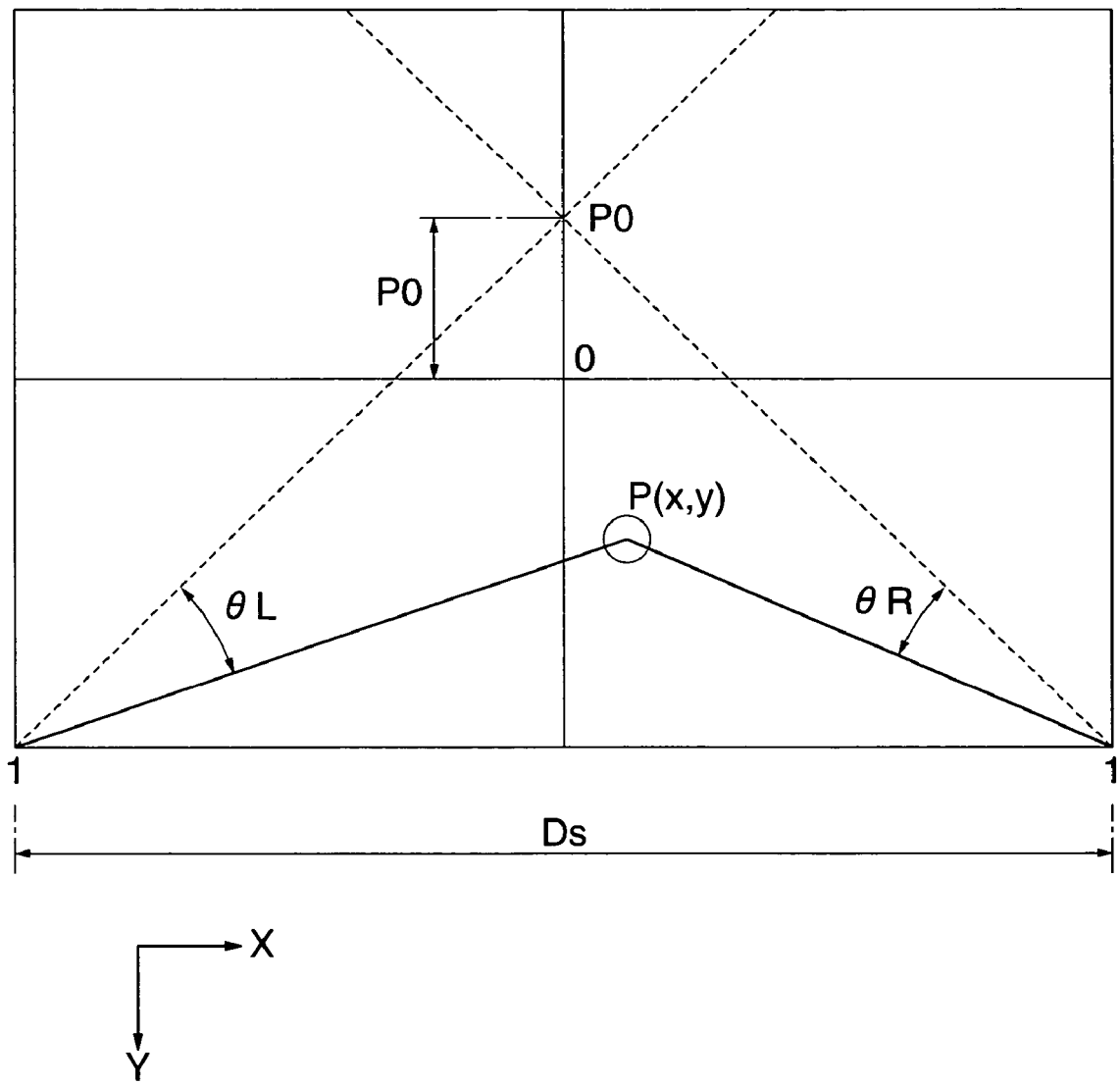
FIG. 27 is a diagram showing the positional relationship between the coordinate input surface in FIG. 1 and a screen coordinate system.

FIG. 27 is a diagram showing the positional relationship between the coordinate input surface 104 in FIG. 1 and a screen coordinate system.

In FIG. 27, the distance between the coordinate sensor units 101L and 101R attached to the respective left and right ends of the bottom side of the coordinate input surface 104 is represented by Ds. The center of the screen is plotted as the origin position of the screen, and P0 represents an intersection point of lines extending at an angle of 0 degrees from the respective coordinate sensor units 101L and 101R. Two angles associated with the respective coordinate sensor units 101L and 101R are represented by θL and θR, and tan θL and tan θR are calculated using the above polynomial.

The x and y coordinates of a point P are calculated as follows:

$$x=(Ds/2)*(\tan \theta L+\tan \theta R)/(1+(\tan \theta L*\tan \theta R))$$

$$y=(Ds/2)*(\tan \theta R-\tan \theta L-(2*\tan \theta L*\tan \theta R))/(1+(\tan \theta L*\tan \theta R))+P0Y$$

In the following, a detailed description will be given of a method of performing pen-up/pen-down determination based on the light-shading amount (steps S17 to S19).

Figure 25:
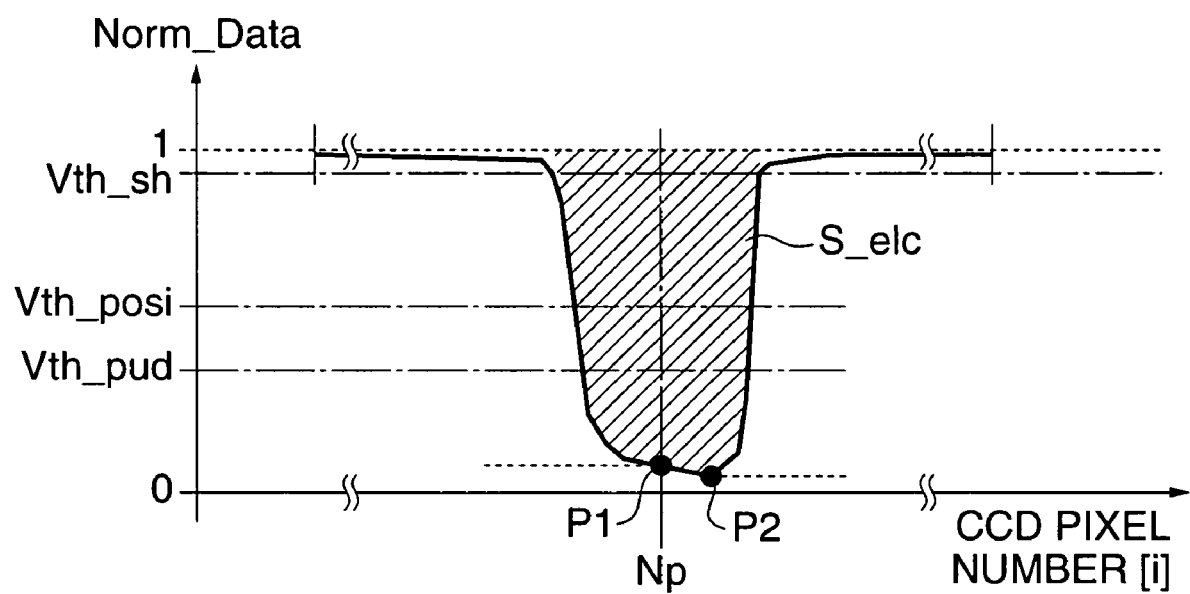
FIG. 25 is a graph useful in explaining a light-shaded portion in the light intensity distribution of light projected from the coordinate sensor units in FIG. 1.

In general, the light-shading-type coordinate input device of this type has been conventionally assumed to employ the method in which threshold values Vth_sh and Vth_pud are set as shown in FIG. 25, and when Norm_data [i] becomes not higher than Vth_sh, it is determined that there is effective light shading, and when Norm_data [i] becomes not higher than Vth_pud, it is determined that a pen-down event has occurred. However, as described hereinbefore, this method is not practical in many cases.

To solve this problem, in the present embodiment, the area of a portion where the waveform of Norm_data [i] has changed (i.e. the area of a hatched portion on the graph in FIG. 25) is defined as the light-shading amount S_elc, and the pen-up/pen-down state is determined based on a temporal change in the light-shading amount S_elc.

The light-shading amount S_elc can be obtained using the following equation described hereinbefore (step S17):

$$S\_elc=\Sigma_{i=1}^{N}[1-\text{Norm\_Data}(i)]$$

Then, a past light-shading amount data group S' is read out from the nonvolatile memory 189 (step S18). By using the light-shading amount currently obtained and the past light-shading amount data group S, and further defining the logic 1, the logic A, and the logic B_1 as in the respective Logical Definitions 1, A, and B_1 described hereinbefore, the pen-down (PenDown) state and the pen-up (PenUp) state are detected by the following logical expressions (step S19):

PenDown=logic 1∩logic A∩logic B_1

PenUp=logic 1∩(/PenDown)

Further, when PenDown is longer than the predetermine time period T0, the logic A, and the logic B_1 are forcibly set to "0" so as to prevent an erroneous operation.

In the following step S20, the calculated coordinate values (X, Y), the result of the pen-up/pen-down determination, and supplementary information are sent to the external host computer or the like. Then, if the processing is not completed (step S21), the past light-shading amount data group S' is updated (step S22), followed by the process returning to the step S12.

The present embodiment makes it possible to detect a pen-down event and a pen-up event (proximity input function) by the above described method. Thus, the same function as that of a coordinate input device equipped with an indication tool having a pen tip switch and means for communication therewith for detection of a pen-down event and a pen-up event (proximity input function) can be realized without the pen tip switch and the communication means.

More specifically, the conventional light-shading-type coordinate input device requires some kind of pen tip switch and some kind of transmission means on the indication tool side, and therefore an indication tool specifically designed for the coordinate input device and requiring a power supply, such as a battery, is needed. In contrast, in the present embodiment, determination of the state of input by a light-shading member, such as the indication tool 105 or a finger, i.e. determination of the pen-up state/pen-down state is performed based on the magnitude of the light-shading amount and a temporal change in the light-shading amount, which can be detected from the light intensity distribution, and therefore the light-shading member is not required to be specifically designed for the coordinate input device insofar as its shape satisfies predetermined conditions. Of course, the battery or other power supply can be dispensed with. Further, since a light intensity distribution waveform originally captured for detection of a light-shaded position can be used as it is, it is not necessary to add any new piece of hardware to the main unit of the coordinate input device, and operability or user-friendliness of the apparatus can be markedly enhanced.

It should be noted that the above described control method can be realized by storing a program, which is prepared in accordance with the flowchart in FIG. 24, e.g. in the nonvolatile memory 189 of the control and coordinate computing unit 102, and executing the program by the computation and control circuit 183.

The present invention may either be applied to a system composed of a plurality of apparatuses or to a single apparatus.

The above program has only to realize the functions of the above described embodiment on a computer, and the form of the program may be an object code, a program code executed by an interpreter, or script data supplied to an OS.

Further, it is to be understood that the object of the present invention may also be accomplished by supplying a computer or a CPU with a program code of software, which realizes the functions of the above described embodiment, and causing the computer or CPU to read out and execute the program code.

Further, it is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-166340 filed Jun. 3, 2004, which is hereby incorporated by reference herein.

What is claimed is:

1. A coordinate input device that detects a position on an input surface indicated by indication means and determines coordinates of the position, comprising:
a light-projecting section that emits light in planar directions along the input surface;
a reflective section that reflects emitted light from said light-projecting section;
a detector section that receives the reflected light from the reflective section, pixel by pixel, and detects the light intensity distribution of the reflected light;
a coordinate calculating section that calculates coordinates of the position indicated by the indication means, based on the light intensity distribution detected by said detector section; and
a determining section that determines an input state of the indication means with respect to the input surface, based on a temporal change in the light intensity distribution,
wherein said determining section determines whether the input state of the indication means is a pen-up state or a pen-down state, based on a temporal change in a first light-shading amount obtained by adding together differences between a light intensity distribution formed when a light-shaded portion shaded from light by the indication means exists on the input surface and a light intensity distribution formed when no light-shaded portion exists on the input surface, in a direction along a sequence of pixels, or based on a temporal change in a first width as a pixel range within which the differences exceed a predetermined level.

2. A coordinate input device that detects a position on an input surface indicated by indication means and determines coordinates of the position, comprising:
a light-projecting section that emits light in planar directions along the input surface;
a reflective section that reflects emitted light from said light-projecting section;
a detector section that receives the reflected light from the reflective section, pixel by pixel, and detects the light intensity distribution of the reflected light;
a coordinate calculating section that calculates coordinates of the position indicated by the indication means, based on the light intensity distribution detected by said detector section; and
a determining section that determines an input state of the indication means with respect to the input surface, based on a temporal change in the light intensity distribution,
wherein said determining section determines whether the input state of the indication means is a pen-up state or a pen-down state, based on a temporal change in a second light-shading amount obtained by adding together changes caused by light shading, in a distribution waveform obtained by normalizing a light intensity distribution formed when a light-shaded portion shaded from light by the indication means exists on the input surface, by a light intensity distribution formed when no light-shaded portion exists on the input surface, in a direction along a sequence of pixels, or based on a temporal change in a second width as a pixel range within which the changes caused by light shading exceed a predetermined level.

3. A coordinate input device as claimed in claim 1, wherein only when a magnitude of the temporal change in the first light-shading amount is not larger than a predetermined threshold value, and at the same time the temporal change is within a time period defined between a time point the temporal change assumes a maximal value and a time point the temporal change assumes a first minimal value thereafter, said determining section determines the input state of the indication means as the pen-down state, whereas when the input state of the indication means is not determined as the pen-down state, said determining section determines the input state of the indication means as the pen-up state.

4. A coordinate input device as claimed in claim 1, wherein only when the first light-shading amount is larger than a predetermined threshold value, said determining section determines whether the input state of the indication means is the pen-up state or the pen-down state.

5. A coordinate input device as claimed in claim 2, wherein only when a magnitude of the temporal change in the second light-shading amount is not larger than a predetermined threshold value, and at the same time the temporal change is within a time period defined between a time point the temporal change assumes a maximal value and a time point the temporal change assumes a first minimal value thereafter, said determining section determines the input state of the indication means as the pen-down state, whereas when the input state of the indication means is not determined as the pen-down state, said determining section determines the input state of the indication means as the pen-up state.

6. A coordinate input device as claimed in claim 2, wherein only when the second light-shading amount is larger than a predetermined threshold value, said determining section determines whether the input state of the indication means is the pen-up state or the pen-down state.

7. A coordinate input device as claimed in claim 1, wherein only when a magnitude of the temporal change in the first width is not larger than a predetermined threshold value and at the same time the temporal change is within a time period defined between a time point the temporal change assumes a maximal value and a time point the temporal change assumes a first minimal value thereafter, said determining section determines the input state of the indication means as the pen-down state, whereas when the input state of the indication means is not determined as the pen-down state, said determining section determines the input state of the indication means as the pen-up state.

8. A coordinate input device as claimed in claim 2, wherein only when a magnitude of the temporal change in the second width is not larger than a predetermined threshold value, and at the same time the temporal change is within a time period defined between a time point the temporal change assumes a maximal value and a time point the temporal change assumes a first minimal value thereafter, said determining section determines the input state of the indication means as the pen-down state, whereas when the input state of the indication means is not determined as the pen-down state, said determining section determines the input state of the indication means as the pen-up state.

9. A coordinate input device as claimed in claim 1, wherein when the input state of the indication means continues to be determined as the pen-up state over a predetermined time period, said determining section determines the input state of the indication means as the pen-up state when the predetermined time period has elapsed.

10. A coordinate input device as claimed in claim 1, further comprising a display device disposed on the input surface.

11. A coordinate input method that detects a position on an input surface indicated by indication means and determines coordinates of the position, comprising:
    emitting light in planar directions along the input surface with a light-projecting section;
    reflecting the emitted light from said light-projecting section with a reflective section;
    receiving the reflected light from the reflective section, pixel by pixel, with a detector section and detecting the light intensity distribution of the reflected light;
    calculating coordinates of the position indicated by the indication means with a coordinate calculating section, based on the light intensity distribution detected by said detector section; and
    determining an input state of the indication means with respect to the input surface with a determining section, based on a temporal change in the light intensity distribution,
    wherein said determining section determines whether the input state of the indication means is a pen-up state or a pen-down state, based on a temporal change in a first light-shading amount obtained by adding together differences between a light intensity distribution formed when a light-shaded portion shaded from light by the indication means exists on the input surface and a light intensity distribution formed when no light-shaded portion exists on the input surface, in a direction along a sequence of pixels, or based on a temporal change in a first width as a pixel range within which the differences exceed a predetermined level.

12. A coordinate input method that detects a position on an input surface indicated by indication means and determines coordinates of the position, comprising:
    emitting light in planar directions along the input surface with a light-projecting section;
    reflecting emitted light from said light-projecting section with a reflective section;
    receiving the reflected light from the reflective section, pixel by pixel, with a detector section and detecting the light intensity distribution of the reflected light;
    calculating coordinates of the position indicated by the indication means, with a coordinate calculating section based on the light intensity distribution detected by said detector section; and
    determining an input state of the indication means with respect to the input surface with a determining section, based on a temporal change in the light intensity distribution,
    wherein said determining section determines whether the input state of the indication means is a pen-up state or a pen-down state, based on a temporal change in a second light-shading amount obtained by adding together changes caused by light shading, in a distribution waveform obtained by normalizing a light intensity distribution formed when a light-shaded portion shaded from light by the indication means exists on the input surface, by a light intensity distribution formed when no light-shaded portion exists on the input surface, in a direction along a sequence of pixels, or based on a temporal change in a second width as a pixel range within which the changes caused by light shading exceed a predetermined level.

13. A machine-readable medium encoded with a coordinate input program that causes a computer to execute a coordinate input method that detects a position on an input surface indicated by indication means and determines coordinates of the position, wherein the coordinate input method comprises:
    emitting light in planar directions along the input surface with a light-projecting section;
    reflecting the emitted light from said light-projecting section with a reflective section;
    receiving the reflected light from the reflective section, pixel by pixel, with a detector section and detecting the light intensity distribution of the reflected light;
    calculating coordinates of the position indicated by the indication means with a coordinate calculating section, based on the light intensity distribution detected by said detector section; and
    determining an input state of the indication means with respect to the input surface with a determining section, based on a temporal change in the light intensity distribution,
    wherein said determining section determines whether the input state of the indication means is a pen-up state or a pen-down state, based on a temporal change in a first light-shading amount obtained by adding together differences between a light intensity distribution formed when a light-shaded portion shaded from light by the indication means exists on the input surface and a light intensity distribution formed when no light-shaded portion exists on the input surface, in a direction along a sequence of pixels, or based on a temporal change in a first width as a pixel range within which the differences exceed a predetermined level.

14. A machine-readable medium encoded with a coordinate input program that causes a computer to execute a coordinate input method that detects a position on an input surface indicated by indication means and determines coordinates of the position, wherein the coordinate input method comprises:
    emitting light in planar directions along the input surface with a light-projecting section;
    reflecting emitted light from said light-projecting section with a reflective section;
    receiving the reflected light from the reflective section, pixel by pixel, with a detector section and detecting the light intensity distribution of the reflected light;
    calculating coordinates of the position indicated by the indication means, with a coordinate calculating section based on the light intensity distribution detected by said detector section; and
    determining an input state of the indication means with respect to the input surface with a determining section, based on a temporal change in the light intensity distribution,
    wherein said determining section determines whether the input state of the indication means is a pen-up state or a pen-down state, based on a temporal change in a second light-shading amount obtained by adding together changes caused by light shading, in a distribution waveform obtained by normalizing a light intensity distribution formed when a light-shaded portion shaded from light by the indication means exists on the input surface, by a light intensity distribution formed when no light-shaded portion exists on the input surface, in a direction along a sequence of pixels, or based on a temporal change in a second width as a pixel range within which the changes caused by light shading exceed a predetermined level.

* * * * *